United States Patent
Matsukawa et al.

(10) Patent No.: US 6,859,546 B2
(45) Date of Patent: Feb. 22, 2005

(54) IMAGE DETECTION APPARATUS, PROGRAM, AND RECORDING MEDIUM

(75) Inventors: Yoshihiko Matsukawa, Nara (JP); Tsuyoshi Mekata, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 647 days.

(21) Appl. No.: 09/997,548

(22) Filed: Nov. 27, 2001

(65) Prior Publication Data

US 2002/0080998 A1 Jun. 27, 2002

(30) Foreign Application Priority Data

Dec. 25, 2000 (JP) .................................... 2000-391939

(51) Int. Cl.[7] .............................................. G06K 9/00
(52) U.S. Cl. ........................ 382/103; 342/90; 348/169
(58) Field of Search ................................ 382/103, 107, 382/236, 287; 342/28, 90, 96, 357.07; 348/94, 154, 155, 169

(56) References Cited

U.S. PATENT DOCUMENTS

| | | | | |
|---|---|---|---|---|
| 5,761,326 A | * | 6/1998 | Brady et al. ................ | 382/103 |
| 5,937,078 A | * | 8/1999 | Hyland et al. ............... | 382/103 |
| 5,991,428 A | * | 11/1999 | Taniguchi .................... | 382/107 |
| 6,504,942 B1 | * | 1/2003 | Hong et al. .................. | 382/103 |
| 6,678,394 B1 | * | 1/2004 | Nichani ....................... | 382/103 |
| 6,771,813 B1 | * | 8/2004 | Katsuyama .................. | 382/165 |

* cited by examiner

Primary Examiner—Bhavesh M. Mehta
Assistant Examiner—Abolfazl Tabatabai
(74) Attorney, Agent, or Firm—Snell & Wilmer, LLP

(57) ABSTRACT

An image detection apparatus for detecting a target in an input image includes a database storing a target data unit, which includes information specifying the target to be detected, used color data, representative color data, and a cluster image; a representative color area extraction section for extracting an area having substantially the same color as the representative color from the input image as a representative color area; a candidate area extraction section for obtaining a candidate area possibly including the target from the representative color area, using relative positions of an area having the representative color and a frame of the cluster image; and a comparison section for comparing the cluster image and the candidate area and detecting the candidate area as an area including the target based on the comparison result.

12 Claims, 20 Drawing Sheets

502 Signboard of gas station
501 Input image 504
506
505
503 Similarity image (used colors other than the achromatic color)

Divided representative color circumscribing areas 801

New representative color circumscribing area generated by combining processing 802

FIG. 9
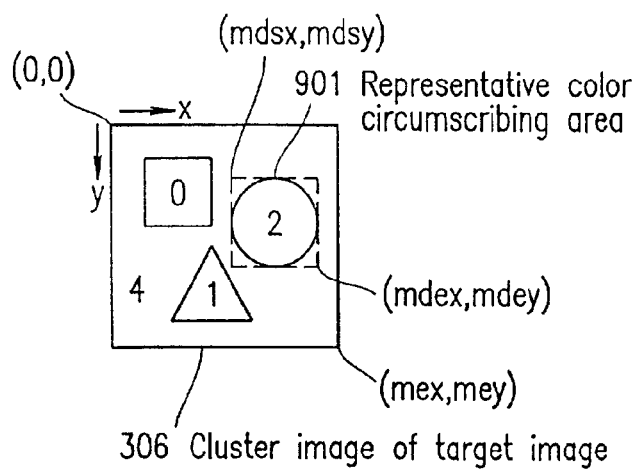
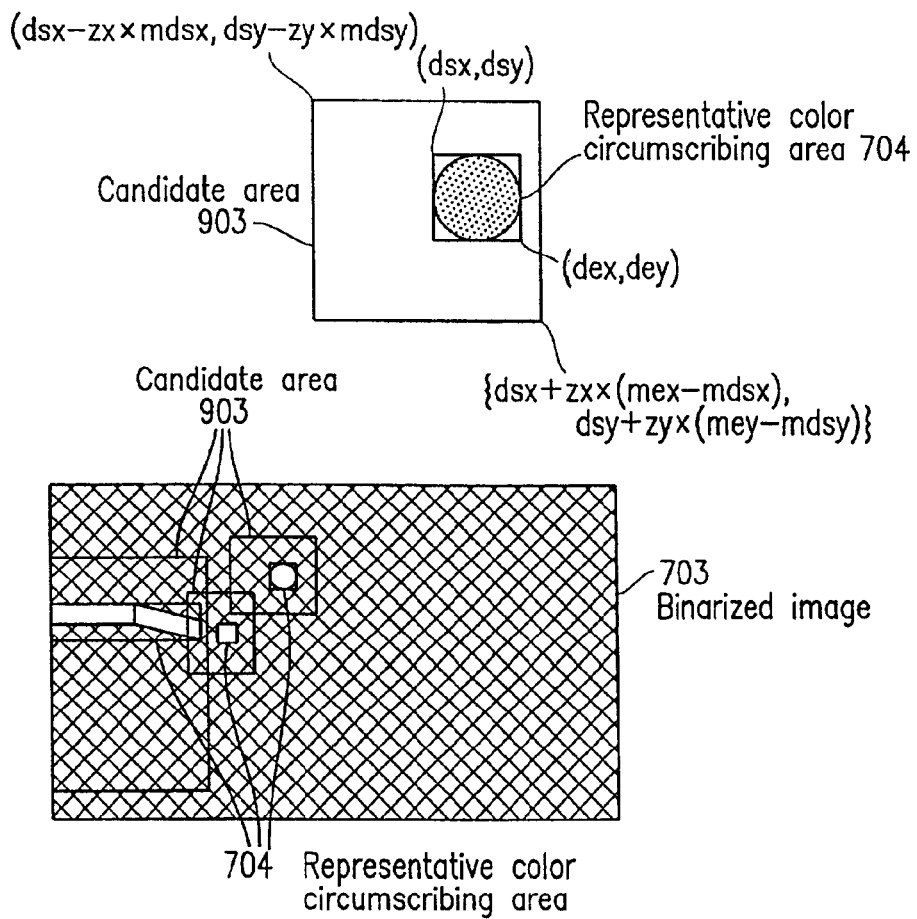

FIG. 10
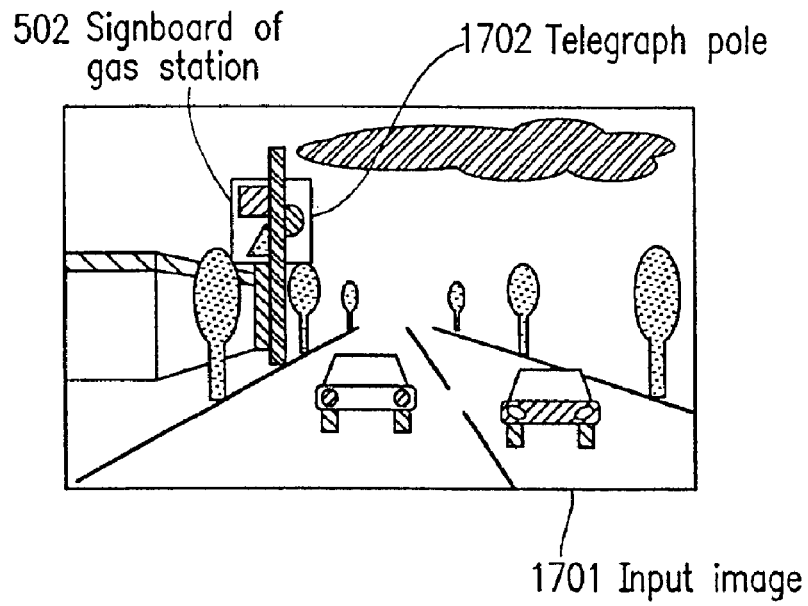
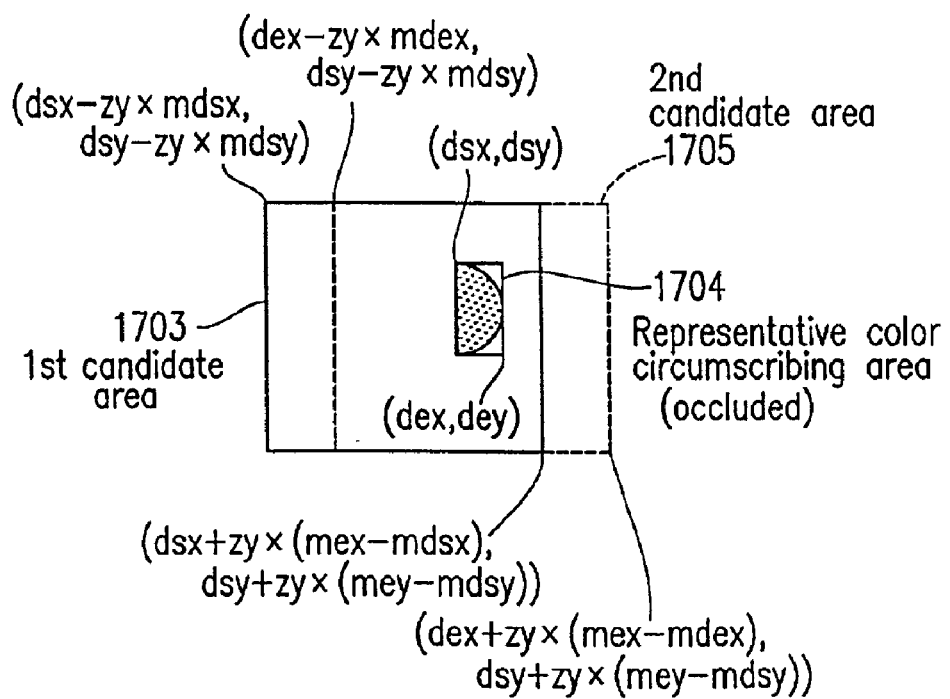

*FIG. 18A*

Database 1505

| | Environment | | | | Signboard A | Signboard B · · |
|---|---|---|---|---|---|---|
| District | Season | Time | Direction | Weather | | |
| 1801 Kyoto | Spring | Morning | North | Fine | Target data unit A1 | Target data unit B1 · · | ← 1805
| Kyoto | Spring | Morning | North | Cloudy | Target data unit A2 | Target data unit B2 · · |
| 1802 Osaka | Spring | Morning | North | Fine | Target data unit A3 | Target data unit B3 · · |
| · · | · · | · · | · · | · · | · · | · · |
| 1803 Snowy region | Winter | Afternoon | North | Fine | Target data unit A8 | Target data unit B8 · · | ← 1806
| Snowy region | Winter | Afternoon | North | Cloudy | Target data unit A9 | Target data unit B9 · · |
| · · | · · | · · | · · | · · | · · | · · |

FIG. 18B
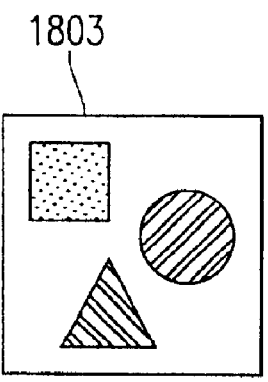
Signboard A in Kyoto
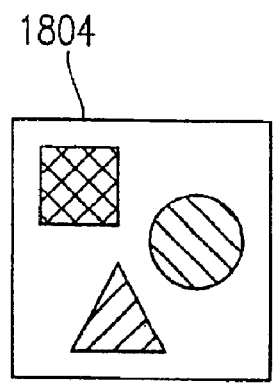
Signboard A in Osaka

IMAGE DETECTION APPARATUS, PROGRAM, AND RECORDING MEDIUM

BACKGROUND OF THE INVENTION

1. Field of the Invention

The present invention relates to an image detection apparatus, and in particular, to an image detection apparatus for a position of a target such as, for example, a signboard, a marking or a traffic signal, in a color image captured by a camera or the like mounted on a moving body, a program for realizing such image detection, and a recording medium storing such a program.

2. Description of the Related Art

A conventionally known image recognition apparatus for recognizing a position of a traffic sign in a color image captured by a camera or the like mounted on a moving body is described in Japanese Publication for Opposition No. 6-52554.

The image recognition apparatus described in Japanese Publication for Opposition No. 6-52554 includes a color imaging section for capturing a color image of a scene in front of a moving body, a feature extraction section for selecting images having a first color and a second color in the obtained color image and extracting the image in the form of binarized image data, an image memory for storing the extracted binarized image data, a reference memory for storing, in advance, a frame pattern having the first color of an image to be detected and a character shape pattern having the second color of the image to be detected, a frame recognition section for comparing the binarized image data stored in the image memory and the frame pattern stored in the reference memory so as to recognize the presence of a frame of a traffic sign, and an in-frame pattern recognition section for recognizing the character shape pattern inside the frame of the traffic sign.

Operation of the above-described conventional image recognition apparatus will be described.

FIG. 19 is a flowchart illustrating an image recognition process performed by the conventional image recognition apparatus.

Step 1901: An image in front of the moving body is captured by the color imaging section and then is converted into digital image data. Each pixel of the digital image data has a digital value representing each of three primary colors, red (R), green (G) and blue (B).

Step 1902: The feature extraction section extracts, from the digital image data, digital binarized image data in which a first color (red for the frame of the traffic sign) and a second color (blue for the characters of the traffic sign) are emphasized. More specifically, only the red pixels and blue pixels are extracted from the digital image data. The extracted binarized image data is stored in the image memory. For example, if the value of R is higher than the value of G and the value of B (i.e., R>G and R>B) in a pixel, that pixel is determined as a red pixel. If the value of G is higher than the value of R and the value of B (i.e., G>R and G>B) in another pixel, that pixel is determined as a green pixel.

Step 1903: The frame recognition section compares reference data representing a frame pattern having the first color of the traffic sign stored in advance in the reference memory with the binarized image data stored in the image memory, for each scanning line.

Step 1904: It is determined whether or not the extracted binarized image data matches the reference data representing the frame pattern stored in the reference memory. When it is determined that the extracted binarized image data does not match the reference data in step 1904, operation returns to step 1901, and the next image is captured. When it is determined that the extracted binarized image data matches the reference data in step 1904, operation advances to step 1905.

Step 1905: The in-frame pattern recognition section recognizes a portion of the extracted binarized image data which corresponds to the inside of the frame of the traffic sign which was detected in step 1904, using the character shape pattern data stored in the reference memory.

Step 1906: It is determined whether or not a character shape pattern matching the binarized image data representing the portion inside the frame of the traffic sign is present in the reference memory. When it is determined that the character shape pattern matching the binarized image data representing the portion inside the frame is not present in the reference memory in step 1906, operation returns to step 1901 and the next image is captured. When it is determined that the character shape pattern matching the binarized image data representing the portion inside the frame is present in the reference memory in step 1906, operation advances to step 1907.

Step 1907: The contents of the character shape pattern matching the binarized image data representing the portion inside the frame is notified to the driver of the moving body.

The above-described conventional image recognition apparatus cannot detect a target other than traffic signs for the following reasons.

(1) Each pixel is represented by three values of R (red), G (green) and B (blue), and the color having the highest value among the three is determined as the color of the pixel. Therefore, it is difficult to detect a target having a color other than red, green or blue.

(2) When the target does not have a frame (or when the frame is of a color which is difficult to detect, for example, white), the frame recognition section cannot recognize the frame and thus cannot specify the position of a portion having the second color.

(3) The conventional image recognition apparatus is limited to the use of two colors of the first color and the second color. The image recognition apparatus is not assumed to be used to detect a signboard including any other number of colors, such as a signboard of a gas station, a convenience store or the like.

The conventional image recognition apparatus cannot possibly improve detection precision for the following reasons.

(1) The frame recognition section cannot extract a frame pattern having a different size from that of the frame pattern having a first color stored in the reference memory. In other words, the frame recognition section cannot deal with a change in scale.

(2) Since the frame and a portion inside the frame are separately recognized, the precise positional relationship of the frame and the portion inside the frame is not considered. The recognition capability needs to be further improved.

(3) District-by-district environmental differences are not considered. For example, a signboard of a branch of a "chain" store in Kyoto, Japan has a color matching the scenery and thus is different from a signboard of a branch of the same chain in another city. When a moving body on which the conventional image recognition apparatus is mounted moves from Kyoto to Osaka, Japan the signboard in both cities cannot be detected.

The conventional image recognition apparatus cannot possibly improve detection speed for the following reasons.

(1) For detecting a frame pattern of a first color, the image recognition apparatus checks each scanning line in the entire area of the image. Such an operation is time-consuming.

(2) For detecting a target from images continuously input, the image recognition apparatus always processes the entire input image without considering the detection results of the images input in the past. Such an operation is also time-consuming.

SUMMARY OF THE INVENTION

According to one aspect of the invention, an image detection apparatus for detecting a target in an input image includes a database storing at least one target data unit, each of the at least one target data unit including information specifying the target to be detected, used color data representing a plurality of used colors which are used in the target, representative color data representing a representative color selected from the plurality of used colors, and a cluster image representing a positional arrangement of a plurality of areas respectively having the plurality of used colors; a representative color area extraction section for receiving the input image and information specifying the target to be detected in the input image, specifying a target data unit, from among at least one target data unit stored in the database, which corresponds to the information specifying the target to be detected in the input image, and extracting from the input image, as a representative color area, at least one area having substantially the same color as the representative color represented by the representative color data included in the specified target data unit; a candidate area extraction section for obtaining at least one candidate area possibly including the target from among the at least one representative color area extracted by the representative color area extraction section, using relative positions of an area having the representative color in the cluster image included in the specified target data unit and a frame of the cluster image; and a comparison section for comparing the cluster image included in the specified target data unit and each of the at least one candidate area obtained by the candidate area extraction section, and detecting one of the at least one candidate area obtained by the candidate area extraction section based on the comparison result as an area including the target.

In one embodiment of the invention, regarding the at least one representative color area, a product of a similarity and a value of one selected from the group consisting of chroma, luminance, and a product of the chroma and the luminance is larger than a predetermined threshold value, the similarity being obtained from a distance between a hue of each pixel included in the input image and the representative color included in the target data unit, and the chroma and the luminance being of each of the pixels included in the input image.

In one embodiment of the invention, the representative color has a highest chroma among the plurality of used colors.

In one embodiment of the invention, the plurality of used colors are each assigned a color number, the cluster image includes a plurality of pixels, and each of the plurality of pixels included in the cluster image has a pixel value represented by the color number.

In one embodiment of the invention, the plurality of used colors include an achromatic color and a non-achromatic color. The comparison section detects one of the at least one candidate area as the area possibly including the target based on an inter-image distance between the cluster image and one of the at least one candidate area. When the number of the non-achromatic colors is larger than a first predetermined value, or the number of areas having the non-achromatic color is larger than a second predetermined value, the inter-image distance is determined independent from an inter-pixel distance between each pixel of an area having the achromatic color in the cluster image and a corresponding pixel in the one candidate area. When the number of the non-achromatic colors is equal to or smaller than the first predetermined value, and the number of areas having the non-achromatic color is equal to or smaller than the second predetermined value, the inter-image distance is determined relying on the inter-pixel distance.

In one embodiment of the invention, the plurality of used colors include an achromatic color and a non-achromatic color. The comparison section detects one of the at least one candidate area as the area possibly including the target based on an inter-image distance between the cluster image and one of the at least one candidate area. When the number of the non-achromatic colors is equal to or smaller than the first predetermined value, and the number of areas having the non-achromatic color is equal to or smaller than the second predetermined value, the inter-image distance is determined based on an inter-pixel distance between each pixel of an area having the achromatic color in the cluster image and a corresponding pixel in the one candidate area and also based on an inter-pixel distance between each pixel of an area having the non-achromatic color in the cluster image and a corresponding pixel in the one candidate area. The inter-pixel distance between each pixel of an area having the achromatic color in the cluster image and a corresponding pixel in the one candidate area is obtained based on a luminance normalized by an average luminance of the area having the representative color in the cluster image and a luminance normalized by an average luminance of the representative color area in the one candidate area. The inter-pixel distance between each pixel of an area having the non-achromatic color in the cluster image and a corresponding pixel in the one candidate area is obtained based on a hue of each pixel in the cluster image and a hue of each pixel in the one candidate area.

In one embodiment of the invention, the candidate area extraction section performs at least one of expansion and reduction of each of the at least one representative color area by a predetermined amount, and obtains a plurality of candidate areas possibly including the target from the at least one representative color area before the expansion or reduction and also obtains a plurality of candidate areas possibly including the target from the at least one representative color area after the expansion or reduction, using relative positions of the area having the representative color area in the cluster image and the frame of the cluster image. The comparison section compares each of the plurality of candidate areas obtained in each of the at least one candidate area with the cluster image, and detects, as an area including the target, a candidate area which corresponds to an inter-image distance, between each of the plurality of candidate areas and the cluster image, which is shortest and is smaller than a predetermined threshold value.

In one embodiment of the invention, the image detection apparatus further includes a detection area memory section for storing at least two detection areas detected by the comparison section in association with time; and a processing area specifying section for specifying a processing area in the input image. The processing area specifying section determines whether or not a positional relationship between the at least two detection areas among the at least two detection areas stored in the detection area memory section fulfills a predetermined condition. When the positional relationship fulfills the predetermined condition, the processing area specifying section specifies the detection section, among the at least two detection sections, which is associated with a latest time and a vicinity thereof as a processing area in the input image. When the positional relationship does not fulfill the predetermined condition, the processing area specifying section specifies the entire input image as a processing area in the input image.

In one embodiment of the invention, the database stores at least one target data set in association with each of at least one environment, and each of the at least one target data set includes at least one target data unit. The image detection apparatus further comprises an environment measuring section for measuring parameters of an environment in which the image detection apparatus is located and selecting, from the at least one target data set, a target data set stored in association with the environment in which the image detection apparatus is located, from among the at least one environment, based on the measurement result. The representative color extraction section receives the information specifying the target to be detected in the input image, and specifies a target data unit having information corresponding to the information specifying the target to be detected in the input image, from the selected target data set.

In one embodiment of the invention, regarding the at least one representative color area, a product of a similarity and one selected, based on the parameters of the environment measured by the environment measuring section, from the group consisting of chroma, luminance, and a product of the chroma and the luminance is larger than a predetermined threshold value, the similarity being obtained from a distance between a hue of each of pixels included in the input image and the representative color included in the target data unit, and the chroma and the luminance being of each of the pixels included in the input image.

According to another aspect of the invention, a program for allowing a computer to act as an image detection apparatus for detecting a target in an input image is provided. The image detection apparatus includes a database storing at least one target data unit, each of the at least one target data unit including information specifying the target to be detected, used color data representing a plurality of used colors which are used in the target, representative color data representing a representative color selected from the plurality of used colors, and a cluster image representing a positional arrangement of a plurality of areas respectively having the plurality of used colors; a representative color area extraction section for receiving the input image and information specifying the target to be detected in the input image, specifying a target data unit, from among at least one target data unit stored in the database, which corresponds to the information specifying the target to be detected in the input image, and extracting from the input image, as a representative color area, at least one area having substantially the same color as the representative color represented by the representative color data included in the specified target data unit; a candidate area extraction section for obtaining at least one candidate area possibly including the target from among the at least one representative color area extracted by the representative color area extraction section, using relative positions of an area having the representative color in the cluster image included in the specified target data unit and a frame of the cluster image; and a comparison section for comparing the cluster image included in the specified target data unit and each of the at least one candidate area obtained by the candidate area extraction section, and detecting one of the at least one candidate area obtained by the candidate area extraction section based on the comparison result.

According to still another aspect of the invention, a computer-readable recording medium storing a program for allowing a computer to act as an image detection apparatus for detecting a target in an input image is provided. The image detection apparatus includes a database storing at least one target data unit, each of the at least one target data unit including information specifying the target to be detected, used color data representing a plurality of used colors which are used in the target, representative color data representing a representative color selected from the plurality of used colors, and a cluster image representing a positional arrangement of a plurality of areas respectively having the plurality of used colors; a representative color area extraction section for receiving the input image and information specifying the target to be detected in the input image, specifying a target data unit, from among at least one target data unit stored in the database, which corresponds to the information specifying the target to be detected in the input image, and extracting from the input image, as a representative color area, at least one area having substantially the same color as the representative color represented by the representative color data included in the specified target data unit; a candidate area extraction section for obtaining at least one candidate area possibly including the target from among the at least one representative color area extracted by the representative color area extraction section, using relative positions of an area having the representative color in the cluster image included in the specified target data unit and a frame of the cluster image; and a comparison section for comparing the cluster image included in the specified target data unit and each of the at least one candidate area obtained by the candidate area extraction section, and detecting one of the at least one candidate area obtained by the candidate area extraction section based on the comparison result.

Thus, the invention described herein makes possible the advantages of providing: (1) an image detection apparatus for detecting a target having any color and any shape; (2) an image detection apparatus having an improved detection precision regardless of the size of the target when it is imaged or the environment in which the target is imaged; and (3) an image detection apparatus having an improved detection speed.

These and other advantages of the present invention will become apparent to those skilled in the art upon reading and understanding the following detailed description with reference to the accompanying figures.

BRIEF DESCRIPTION OF THE DRAWINGS

FIG. 9 schematically shows a process for generating a candidate area from the representative color circumscribing area;

FIG. 10 schematically shows another process for generating a candidate area from the representative color circumscribing area;

FIG. 18A schematically shows target data units stored in a database in association with environment sets;

FIG. 18B schematically shows an example of signboards used in Kyoto and Osaka;

DESCRIPTION OF THE EMBODIMENTS

Hereinafter, the present invention will be described by way of illustrative examples with reference to the accompanying drawings.

EXAMPLE 1

Figure 1:
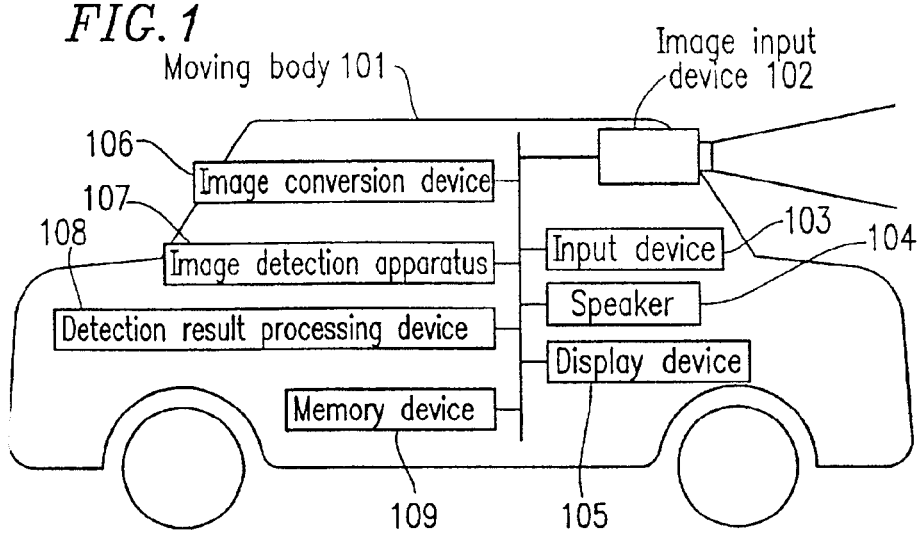
FIG. 1 shows an example of a structure of a moving body including an image detection apparatus according to the present invention.

FIG. 1 shows an exemplary structure of a moving body 101 including an image detection apparatus 107 according to the present invention.

The moving body 101 includes the image detection apparatus 107, an image input device 102, an input device 103, a speaker 104, a display device 105, an image conversion device 106, a detection result processing device 108, and a memory device 109. Herein, the moving body 101 is any object which can move by itself or can be moved by a force exerted by another element, together with a user. The moving body 101 may be, for example, an automobile, a motorbike or a bicycle. In the case where the user moves while carrying the image detection apparatus 107 and the like, the moving body 101 may be the user.

The image input device 102 is located so as to image a view in front of the moving body 101. The image input device 102 is, for example, a camera mounted on an automobile, but is not limited to this. An image captured by the image input device 102 is output from the image input device 102 as an input image. The input image is RGB digital data. Namely, each pixel of the input image has a digital value representing red (R), a digital value representing green (G) and a digital value representing blue (B). The input image is stored in the memory device 109. The memory device 109 may be any type of memory (for example, a hard disc drive).

The image conversion device 106 reads the input image stored in the memory device 109 and converts the data format of the input image. The post-conversion input image is HSV digital data. Namely, each pixel of the post-conversion input image has a digital value representing hue (H) (for example, a value in the range of 0 to 360 degrees), a digital value representing chroma (S) (for example, a value in the range of 0 to 1), and a digital value representing a luminance (V) (for example, a value in the range of 0 to 255). The post-conversion input image is stored in the memory device 109.

The input device 103 is used to designate a target to be detected in the input image. The target to be detected is, for example, a convenience store, a gas station, a traffic sign, a traffic signal or the like. The input device 103 may include buttons corresponding to possible targets, or a keyboard for allowing the user to input the name of the target. The input device 103 can include a voice recognition device for recognizing the target based on the voice of the user (for example, the voice of the user pronouncing the name of the target). The user may be a driver driving the moving body 101 or a passenger of the moving body 101.

When the target to be detected in the input image is designated by the input device 103, the image detection apparatus 107 reads the input image (HSV digital data) stored in the memory device 109, and detects the target in the input image. A method for detection will be described below in detail with reference to FIG. 5. The detection result obtained by the image detection apparatus 107 (for example, a coordinate representing the position of the target in the input image) is output to the detection result processing device 108.

The detection result processing device 108 processes the detection result output from the image detection apparatus 107 so as to generate voice data to be output to the speaker 104 and/or display data to be output to the display device 105. The voice data generated by the detection result processing device 108 is output to the speaker 104. As a result, an audio message such as "The target is to the upper left" is output from the speaker 104. Thus, the user can audibly recognize the position of the target in the input image. The display data generated by the detection result processing device 108 is output to the display device 105. As a result, an area including the target is displayed with a noticeable color (for example, yellow) in the display device 105. Thus, the user can visually recognize the position of the target in the input image.

Figure 2:
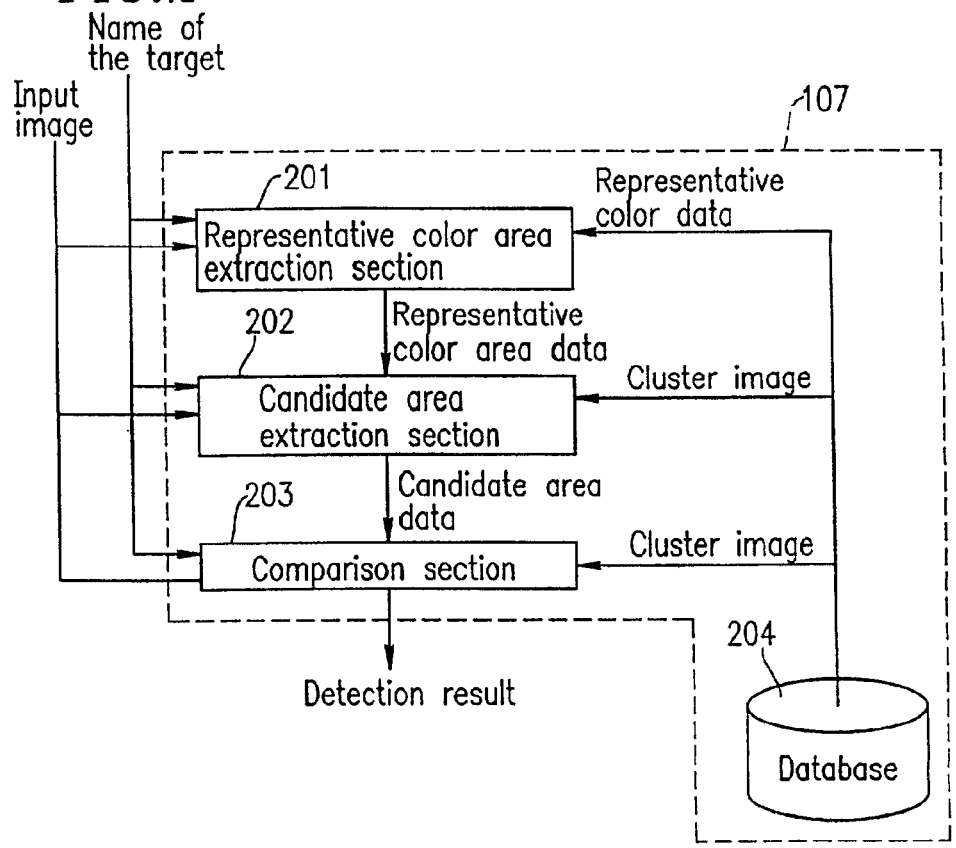
FIG. 2 shows an exemplary structure of an image detection apparatus according to the present invention.

FIG. 2 shows an exemplary structure of the image detection apparatus 107 according to the present invention. The image detection apparatus 107 includes a representative color area extraction section 201, a candidate area extraction section 202, a comparison section 203, and a database 204.

The database 204 stores at least one target data unit. Each target data unit stored in the database 204 represents a target to be detected. The target data unit includes information specifying the target (for example, the name of the target), used color data representing a plurality of used colors used in the target, representative color data representing a representative color among the plurality of colors, and a cluster image representing the positional arrangement of a plurality of areas having the plurality of colors. The representative color is one color selected from the plurality of used colors in the target.

When the target to be detected in the input image is designated by the input device 103, information specifying the target (for example, the name of the target) is input to the representative color area extraction section 201, the candidate area extraction section 202, and the comparison section 203.

The representative color area extraction section 201 searches through the database 204 using the information specifying the target which is input to the representative color area extraction section 201 (for example, the name of the target) as a key, so as to specify a target data unit having information corresponding to the information specifying the target which is input to the representative color area extraction section 201 (for example, the name of the target), from among the at least one target data unit stored in the database 204.

The representative color area extraction section 201 reads the input image stored in the memory device 109 (HSV digital data), reads representative color data included in the specified target data unit from the database 204, and extracts, from the input image, at least one area having substantially the same color as the representative color represented by the representative color data as a representative color area. Representative color area data representing the at least one representative color area which is extracted by the representative color area extraction section 201 is output to the candidate area extraction section 202. The representative color area data is, for example, coordinate data representing the position of the representative color area in the input image.

The candidate area extraction section 202 reads the input image stored in the memory device 109 and searches through the database 204 using the information specifying the target which is input to the representative color area extraction section 201 (for example, the name of the target) as a key, so as to specify a target data unit having information corresponding to the information specifying the target which is input to the representative color area extraction section 201 (for example, the name of the target), from among the at least one target data unit stored in the database 204.

The candidate area extraction section 202 receives the representative color area data from the representative color area extraction section 201, and reads, from the database 204, a cluster image included in the specified target data unit. The candidate area extraction section 202 then obtains at least one candidate area, which possibly includes the target, from among the at least one representative color area extracted by the representative color area extraction section 201, using the relative positions of an area having the representative color in the cluster image and a frame of the cluster image. Candidate area data representing the at least one candidate area obtained by the candidate area extraction section 202 is output to the comparison section 203. The candidate area data is, for example, coordinate data representing the position of the candidate area in the input image.

The comparison section 203 reads the input image stored in the memory device 109 and searches through the database 204 using the information specifying the target input to the representative color area extraction section 201 as a key (for example, the name of the target), so as to specify a target data unit having information corresponding to the information specifying the target which is input to the representative color area extraction section 201 (for example, the name of the target), from among the at least one target data unit stored in the database 204.

The comparison section 203 receives the candidate area data from the candidate area extraction section 202, and reads, from the database 204, a cluster image included in the specified target data unit. The comparison section 203 then compares the cluster image and each of the at least one candidate area obtained by the candidate area extraction section 202, and based on the comparison result, detects one of the at least one candidate areas obtained by the candidate area extraction section 202 as an area including the target. Detection area data representing the area detected by the comparison section 203 (detection result) is output to the outside of the image detection apparatus 107. The detection result is, for example, coordinate data representing the position of the area detected in the input image.

As described above, the image detection apparatus 107 according to the present invention includes the database 204 storing at least one target data unit. Each of the at least one target data unit includes used color data representing a plurality of used colors used in the target, representative color data representing a representative color among the plurality of colors, and a cluster image representing the positional arrangement of a plurality of areas having the plurality of colors. Thus, a target data unit representing a target having any color and any shape can be stored in the database 204. As a result, a target having any color and any shape can be detected.

In the image detection apparatus 107 according to the present invention, an area having substantially the same color as the representative color included in the specified target data unit is extracted, by the representative color area extraction section 201, from the input image as a representative color area, regardless of the shape of the representative color area. Then, candidate areas which possibly include the target can be obtained, by the candidate area extraction section 202, using the relative positions of an area having the representative color in the cluster image and a frame of the cluster image, regardless of the size of the cluster image. Thus, the processing speed of the image detection apparatus 107 can be improved.

In the image detection apparatus 107 according to the present invention, the comparison section 203 performs the comparison in consideration of the positional arrangement of the areas having the used colors used for the target as well as the shape of the areas having the used colors used for the target. Thus, the detection precision of the image detection apparatus 107 can be improved over the case where the comparison is performed in consideration only of the shape of the areas.

In the example shown in FIG. 2, the representative color area extraction section 201, the candidate area extraction section 202, and the comparison section 203 each search through the database 204. The structure of the image detection apparatus 107 is not limited to this. According to an alternative structure, the image detection apparatus 107 operates as follows. When the target to be detected in the input image is designated by the input device 103, information specifying the target (for example, the name of the target) is input to a database search device (not shown). The database search device searches through the database 204 and provides the results to the representative color area extraction section 201, the candidate area extraction section 202, and the comparison section 203. As another alternative, one of the representative color area extraction section 201, the candidate area extraction section 202, or the comparison section 203 has a function of the database search section.

In the example shown in FIG. 2, the database 204 is provided separately from the memory device 109 (FIG. 1), but the structure of the image detection apparatus 107 is not limited to this. The database 204 may be included in the memory device 109.

Figure 3:
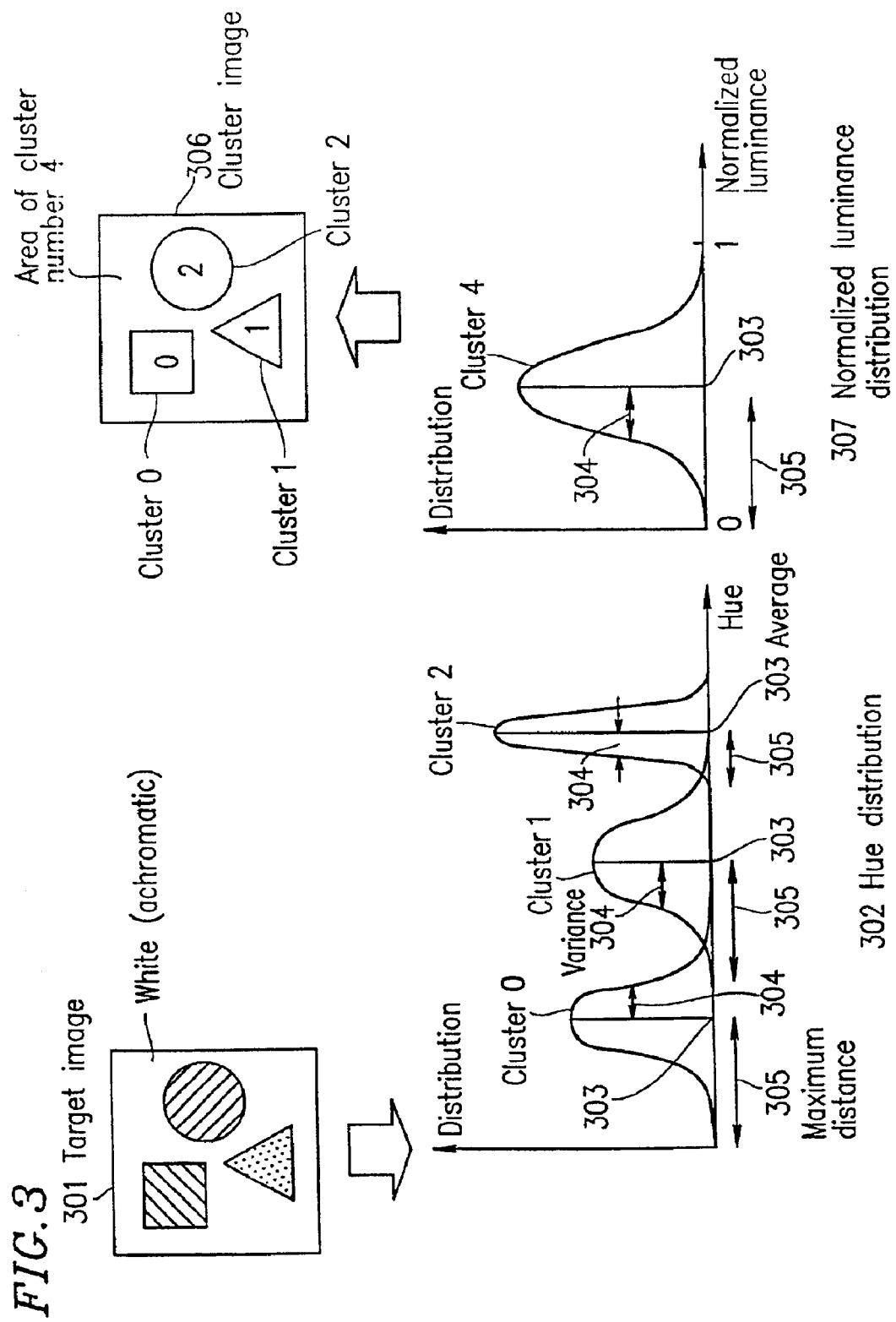
FIG. 3 schematically shows a process for generating a cluster image included in a target data unit based on a target image.

FIG. 3 schematically shows a process for generating a cluster image 306 included in the target data unit based on a target image 301. The target image 301 is obtained by capturing the target. By the process shown in FIG. 3, the cluster image 306 is generated based on the target image 301. The generated cluster image 306 is stored in the database 204 as a part of the target data unit.

With reference to FIG. 3, how used color data, representative color data and a cluster image included in a target data unit are defined will be described.

(1) Used Color Data

Pixels included in a target image 301 are classified into pixels having an "achromatic color" and pixels having a "non-achromatic color". Pixels having an "achromatic color" are pixels having a chroma lower than a predetermined threshold value Ts (for example, 0.25). Pixels having an "achromatic color" are pixels other than the pixels having an "achromatic color".

In the example shown in FIG. 3, the target image 301 includes three areas having different foreground colors (shown as a square, circle and triangle) and an area having a background color (white). The pixels included in the three areas having different foreground colors (square, circle and triangle) are examples of the pixels having the "non-achromatic color". The pixels included in the area having a background color (white) are examples of the pixels having an "achromatic color". In this example, three colors are used for the target, but the number of colors is not limited to three but can be any number.

Among the pixels included in the target image 301, the pixels having a "non-achromatic color" are classified into at least one cluster based on a value of each pixel representing a hue (H). Such classification (clustering) is performed in accordance with a predetermined clustering technique. One exemplary predetermined clustering technique is the K-means technique which designates the number of colors ("3" in the example shown in FIG. 3). A cluster is a set of pixels.

FIG. 3 includes a hue distribution 302. "Cluster 0", "cluster 1", and "cluster 2" in the hue distribution 302 are results of classifying the pixels having a "non-achromatic" color included in the target image 301. Each cluster has an average 303 and a variance 304 obtained by the hue (H) distribution of the pixels belonging to the cluster. A maximum distance 305 is defined as the maximum distance between the center of the cluster (average 303) and the hue (H) of the pixels belonging to the cluster. As the distance, the Mahalanobis distance ("Handbook of Image Analysis", Tokyo University Shuppankai, page 32) is usable. The Euclid distance is also usable instead of the Mahalanobis distance.

Among the pixels included in the target image 301, the pixels having the "achromatic color" are classified into at least one cluster. The cluster also has an average 303, a variance 304, and a maximum distance 305 by the normalized luminance distribution of the pixels belonging to the cluster. The normalized luminance of each pixel having the "achromatic color" is its luminance value divided by the average luminance of the area having the representative color.

FIG. 3 includes a normalized luminance distribution 307. "Cluster 4" in the normalized luminance distribution 307 is a result of classifying the pixels having the "achromatic color" included in the target image 301. The normalized luminance distribution 307 is used as a feature amount of the achromatic area when comparing the candidate area and the cluster image.

One used color which is used for the target is defined by the average 303, the variance 304, and the maximum distance 305 of one cluster. In the example shown in FIG. 3, one of the foreground colors is defined by the average 303, the variance 304, and the maximum distance 305 of "cluster 0". Another foreground color is defined by the average 303, the variance 304, and the maximum distance 305 of "cluster 1". The remaining foreground color is defined by the average 303, the variance 304, and the maximum distance 305 of "cluster 2". The background color (white) is defined by the average 303, the variance 304, and the maximum distance 305 of "cluster 4".

The used color data represents a plurality of used color used for the target. Accordingly, the used color data is defined by a set of used colors (i.e., the set including the average 303, the variance 304, and the maximum distance 305).

In the example shown in FIG. 3, the cluster numbers (color numbers) 0, 1, and 2 are assigned to the three clusters appearing in the hue distribution 302, sequentially from the cluster having the minimum average 303. The cluster number 4 (the number of the non-achromatic colors+1) is assigned to the cluster appearing in the normalized luminance distribution 307. However, the method of assigning the cluster numbers is not limited to this, and the cluster numbers may be assigned in an arbitrary manner.

(2) Representative Color Data

An average of the chroma of pixels belonging to each cluster is found. The representative color is defined as the used color, among the plurality of used colors used for the target, corresponding to the cluster having the maximum average of the chroma. Alternatively, the one used color may be defined as the representative color by the user manually. The representative color data represents the representative color.

(3) Cluster Image

A cluster image 306 is obtained by assigning the cluster number of each cluster to each pixel of the target image 301. In other words, the cluster image 306 includes an area including the pixels having cluster number 0 as a pixel value, an area including the pixels having cluster number 1 as a pixel value, an area including the pixels having cluster number 2 as a pixel value, and an area including the pixels having cluster number 4 as a pixel value.

Figure 4:
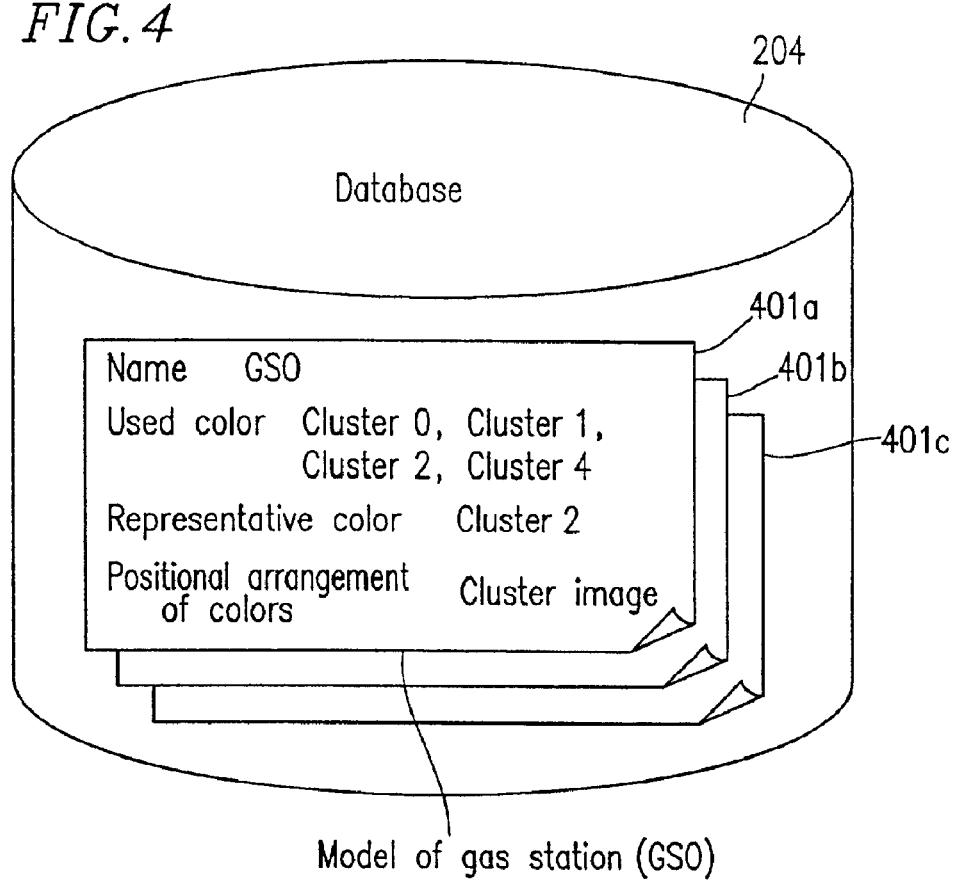
FIG. 4 schematically shows a plurality of target data units stored in a database.

FIG. 4 schematically shows a plurality of target data units 401a, 401b, 401c, . . . which are stored in the database 204. In the example shown in FIG. 4, the target data unit 401a represents a gas station (GS0) model. The target data unit 401a is obtained based on, for example, the target image 301 (FIG. 3).

The target data unit 401a includes "GS0" as data representing the name of the target and includes "cluster 0", "cluster 1", "cluster 2" and "cluster 4" as data representing the used color (used color data). The target data unit 401a also includes "cluster 2" as data representing the representative color (representative color data) and includes an cluster image as data representing the positional arrangement of the areas having the used colors.

Figure 5:
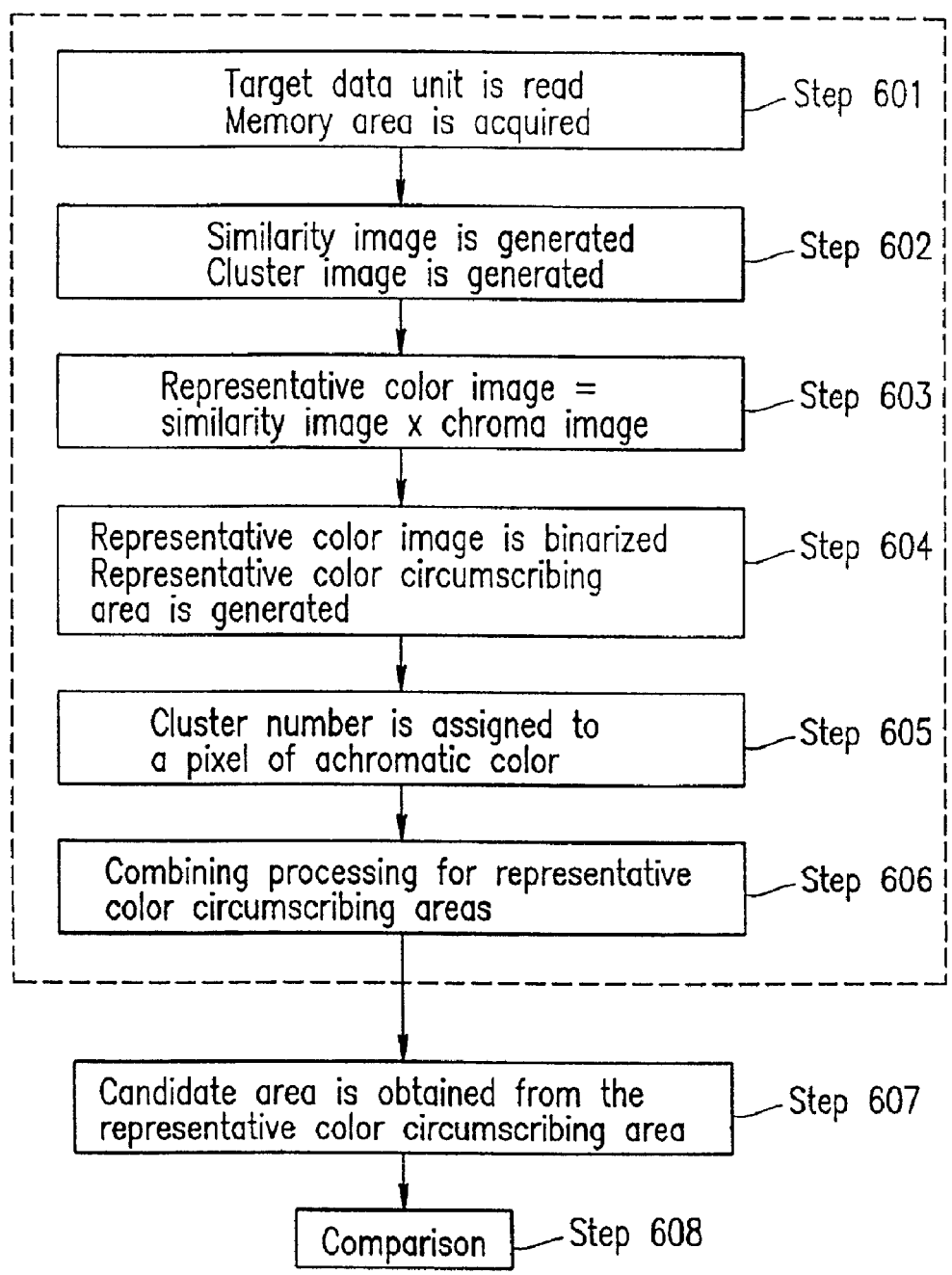
FIG. 5 shows a flow of a program for allowing a computer to act as an image detection apparatus according to the present invention.

FIG. 5 shows a flow of a program for allowing a computer to act as the image detection apparatus 107. The program is provided to the user, for example, as information written on a recording medium. The program is stored in a memory in the computer by the user installing the program in the computer in accordance with a predetermined process. A processor (CPU) in the computer executes the program, so as to allow the computer to act as the image detection apparatus 107.

The function of the representative color area extraction section 201 (FIG. 2) corresponds to steps 601 through 606 shown in FIG. 5, the function of the candidate area extraction section 202 corresponds to step 607 shown in FIG. 5, and the function of the comparison section 203 corresponds to step 608 shown in FIG. 5.

Herein, it is assumed that information specifying the target to be detected in the input image (for example, the name of the gas station) has been input to the image detection apparatus 107. In the manner described below, the image detection apparatus 107 determines whether or not there is a target to be detected (for example, the signboard of the gas station) is present in the input image.

Figure 6A:
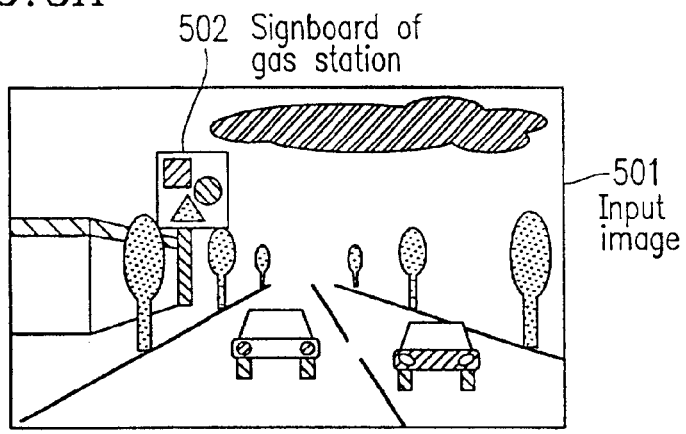
FIG. 6A shows an example of an input image input to the image detection apparatus.

FIG. 6A shows an input image 501 as an example of the input image which is input to the image detection apparatus 107. The input image 501 is obtained by converting the data format of an image (an image in front of the moving body 101 shown in FIG. 1) captured by the image input device 102 by the image conversion device 106. The image captured by the image input device 102 is in the RGB format, and the input image 501 is in the HSV format. As shown in FIG. 6A, the input image 501 includes an image 502 of a signboard of a gas station. Here, it is assumed that the target to be detected in the input image 501 is the signboard of the gas station.

Hereinafter, each of the steps of the program will be described with reference to FIG. 5.

Step 601: The representative color area extraction section 201 reads, from the database 204, the target data unit 401a (FIG. 4) having a name matching the name of the gas station (GS0). Then, the representative color area extraction section 201 acquires a memory area which is required for extracting a representative color area having substantially the same color as the representative color which is represented by the representative color data included in the target data unit 401a from the input image 501. The memory area is acquired of the memory device 109. In the memory area of the memory device 109, a similarity image, a cluster image and a representative color image are stored as described below.

Step 602: The representative color area extraction section 201 generates the similarity image and the cluster image based on the input image 501. A similarity image represents how similar a hue of each pixel of the input image 501 to the used color which is represented by the used color data included in the target data unit 401a. A cluster image represents which used color other than the achromatic colors corresponds to each pixel of the input image 501 in the target data unit 401a. Each pixel of the cluster image has a pixel value which is represented by the color number of the corresponding cluster. Each pixel of the similarity image generated based on the input image 501 only represents the similarity with the used colors other than the achromatic colors in the target data unit 401a. The similarity does not represent which used color is similar to each pixel of the input image 501. Accordingly, the cluster image is used to show which color among the used colors represented by the used color data included in the target data unit 401a corresponds to each pixel of the similarity image.

A cluster image is obtained as follows. Among the three pixel values (hue, chroma and luminance), the hue is used. Regarding each pixel of the input image 501, the distance in hue between the pixel and a cluster having each used color other than achromatic colors is obtained (in the first example, the cluster having the achromatic color is cluster 4). As the distance, the Mahalanobis distance is used. Regarding each pixel, the cluster having the minimum distance, among the distances between the pixel and the cluster having each used color represented by the used color data, is obtained. The obtained cluster is determined as the cluster to which the pixel belongs. To each pixel of the cluster image, the color number of the cluster to which the corresponding each pixel of the input image 501 belongs (one of clusters 0 through 2) is assigned as a pixel value.

A similarity image is obtained as follows. To each pixel of an image to be the similarity image, a similarity obtained by the following expression is assigned as a pixel value. The similarity is obtained using (i) the distance between the corresponding pixel in the input image 501 and the cluster to which the pixel belongs and (ii) the maximum distance 305 (FIG. 3) of the cluster to which the pixel belongs. That is, $$\text{Similarity} = (\text{maximum distance} - \text{distance}) / \text{maximum distance}$$

The similarity is obtained using the above expression for each pixel of the input image 501. Any pixel having a negative value as the similarity is determined not to belong to any cluster. The corresponding pixel in the cluster image is assigned cluster number 3 (since the color numbers of the clusters of non-achromatic colors are 0 through 2, the next value to the maximum color number of the clusters of non-achromatic colors is used). The corresponding pixel in the similarity image is assigned the similarity 0. As described above, for each pixel of the input image 501, the similarity is obtained using the above expression. The similarity (0 through 1) obtained for each of the pixels of the input image 501 is stored, in step 601, as a pixel value in a similarity image in the memory area acquired in the memory device 109.

Figure 6B:
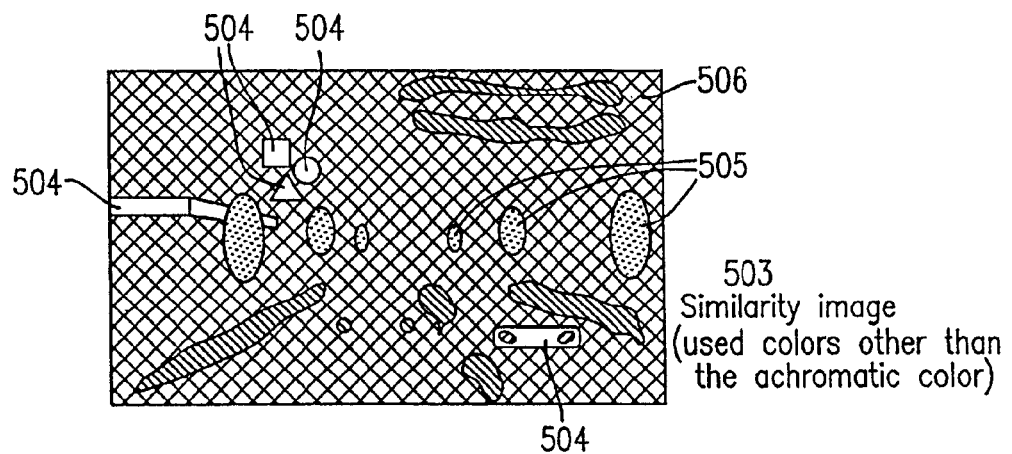
FIG. 6B shows an example of a similarity image, on a representative color other than an achromatic color, generated from the input image by a representative color extraction section.

FIG. 6B shows an exemplary similarity image 503 for the used colors other than the achromatic colors, which is generated from the input image 501 by the representative color area extraction section 201. The similarity image 503 represents, with the use of hatching patterns, the similarity of each pixel and any one of the three used colors (cluster numbers 0 through 2) represented by the used color data other than the achromatic colors. For example, each pixel of an unhatched (white) area 504 has a very high similarity with any one of the three used colors, each pixel of a dotted area 505 has a low similarity with all the three used colors, and each pixel of a meshed (background) area 506 has a negative similarity with all the three used colors (i.e., is not similar at all).

Step 603: The representative color area extraction section 201 generates a representative color image based on the similarity image 503 and the cluster image generated in step 602 and a chrome image of the input image 501. A representative color image represents an area having substantially the same color as the representative color represented by the representative color data (in the first example, cluster 2 has the representative color) and an area having the other colors in the input image 501.

A representative color image is obtained as follows. Regarding each pixel of the cluster image generated in step 602 which has a pixel value matching the color number of the representative color represented by the representative color data, the pixel value of the corresponding pixel in the similarity image 503 generated in step 602 (similarity) is multiplied by the pixel value of the corresponding pixel in a chroma image of the input image 501. (A chroma image is an image representing only the chroma of the input image 501 among the three pixel values of each pixel of the input image 501; and thus the pixel value of the corresponding pixel in the chroma image is a chroma value).

The pixels in the representative color image corresponding to the pixel values in a cluster image, which are not the color number of the representative color represented by the representative color data (in the first example, such pixel values correspond to cluster numbers 0 and 1), and the pixels in the representative color image corresponding to cluster number 3 are assigned a pixel value of 0.

Figure 7A:
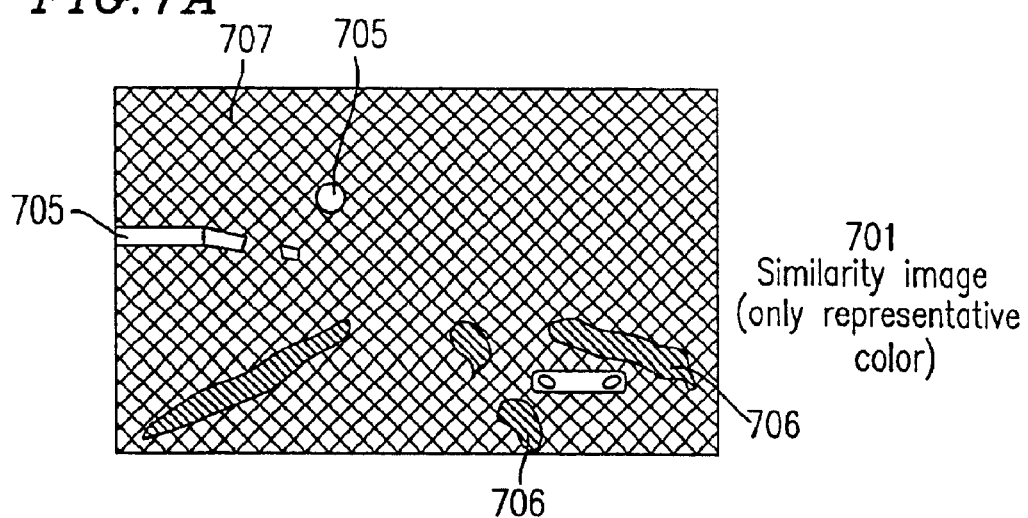
FIG. 7A shows an example of a similarity image, on the representative color, generated from the input image by the representative color extraction section.

FIG. 7A shows an exemplary similarity image 701 for the representative color, generated from the input image 501 by the representative color area extraction section 201. In the similarity image 701 for the representative color, each pixel of an unhatched (white) area 705 has a high similarity with the representative color, each pixel of an oblique-lined area 706 has a low similarity with the representative color, and each pixel of the meshed (background) area 707 has a color other than the representative color.

Figure 7B:
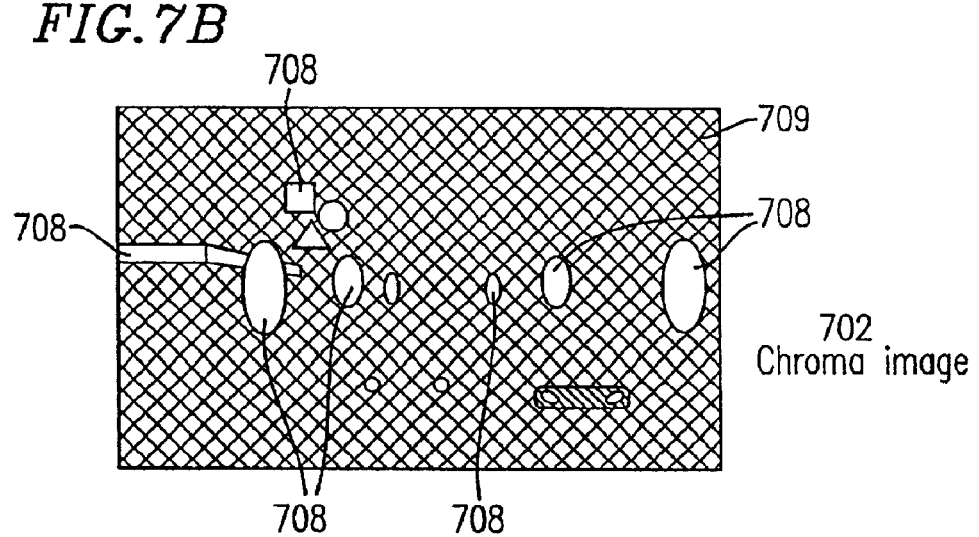
FIG. 7B shows an example of a chroma image representing each pixel of the input image with the chroma.

FIG. 7B shows an exemplary chroma image 702 representing each pixel of the input image 501 with the chroma. As described above, the chroma image 702 represents only the chroma among the three pixel values of the input image 501. In the chroma image 702, a bright portion (having a high chroma) 708 is represented by a high luminance (i.e., white) regardless of the color of each pixel. The representative color image (not shown) is obtained by multiplying each pixel of the similarity image 701 by the corresponding pixel of the chroma image 702. Each pixel of the representative color image obtained in this manner has a value in the range of 1 to 0.

The similarity image 701 is multiplied by the chroma image 702 in order to prevent the similarity in the hue from accidentally increasing. In general, a pixel having a low chroma has unstable hue. When the similarity is multiplied by the chroma (a real number of 0 through 1), the similarity can be restricted to 0 for a pixel having a low chroma (close to 0), and the similarity can be maintained for a pixel having a high chroma (close to 1). The representative color image obtained in this manner is stored in the memory area acquired in the memory device 109 in step 601.

Step 604: The representative color area extraction section 201 binarizes the representative color image generated in step 603 (each pixel of the representative color image has a value of 0 through 1). Thus, the representative color area extraction section 201 extracts a representative color area having substantially the same color as the representative color from the representative color image. A circumscribing quadrangle surrounding the obtained representative color area is acquired as a representative color circumscribing area.

In this specification, a pixel included in the representative color area has the following feature. A product of a similarity obtained based on the distance between the hue of pixel of the input image 501 and the cluster of the representative color and the chroma of the pixel is equal to or higher than a threshold value. The representative color area can be defined as an area having substantially the same color as the representative color (an area formed of pixels having substantially the same color as the representative color). In this example, the "pixels having substantially the same color as the representative color" means that (the similarity between the hue of the pixel and the cluster of the representative color)×(chroma of the pixel) is equal to or higher than a threshold value.

For performing binarization, the discrimination analysis method (Otsu's method, "Handbook of Image Analysis", Tokyo University Shuppankai, page 503) is usable. In order to determine the threshold value for binarization, only the pixels corresponding to the cluster number of the representative color represented by the representative color data (in this example, cluster number 2) is used, rather than all the pixels in the representative color image generated in step 603. The representative color circumscribing area is obtained by tracing the profile of the representative color area of a binarized image 703 (described below with reference to FIG. 7C) obtained by the binarization in accordance with the description in "Handbook of Image Analysis", Tokyo University Shuppankai, page 579.

Figure 7C:
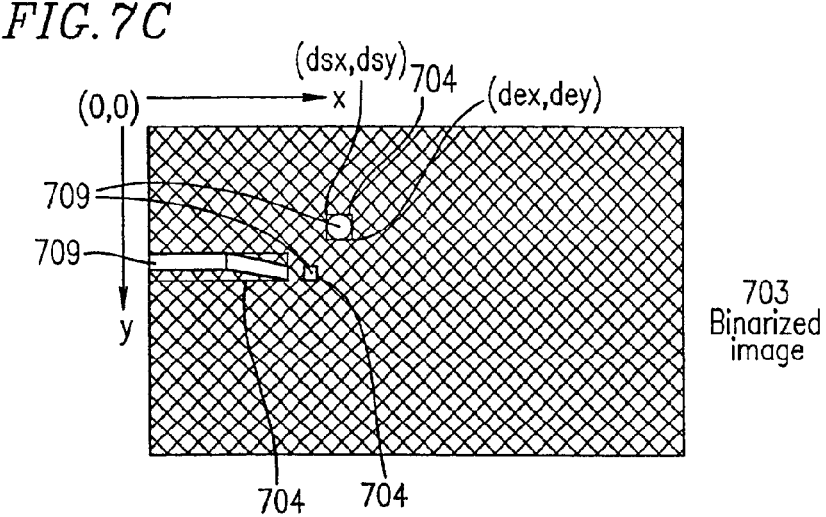
FIG. 7C shows an example of a binarized image generated from the input image by the representative color extraction section.

FIG. 7C shows an exemplary binarized image 703 generated from the input image 501 by the representative color area extraction section 201. In the binarized image 703, representative color areas 709 are represented by white areas, and the remaining area (background) is represented by a meshed area. In the first example, there are three representative color areas 709 obtained from the binarized image 703, and there are also three representative color circumscribing areas 704 respectively surrounding the representative color areas 709. Each representative color circumscribing area 704 is represented by a quadrangular area defined by an upper left coordinate (dsx, dsy) and a lower right coordinate (dex, dey) in a coordinate system having the upper left corner of the binarized image 703 as the origin (0, 0), the side of the binarized image 703 extending horizontally from the origin as the x axis, and the side of the binarized image 703 extending vertically from the origin as the y axis. The number of representative color areas 709 is arbitrary.

It should be noted that in steps 601 through 604, only the non-achromatic colors (in the first example, clusters 0 through 2) among the used colors represented by the used color data included in the target data unit 401a are considered, and achromatic colors are not considered.

Step 605: The representative color area extraction section 201 assigns a cluster number to each pixel in an area having an achromatic color in the input image 501.

A pixel in the cluster image corresponding to a pixel in the input image 501 which has a chroma lower than a predetermined threshold value Ts (for example, 0.25) is assigned the value 4 (i.e., the number of non-achromatic colors+1) as a pixel value. The value 4 is identical to cluster number 4 of the non-achromatic color among the used colors represented by the used color data included in the target data unit 401a. By assigning a pixel in a low chroma area (achromatic color area) the same number as the cluster number in the target data unit 401a, comparison can be performed in step 607 described below using the feature that the area of cluster number 4 has a "low chroma".

Figure 7D:
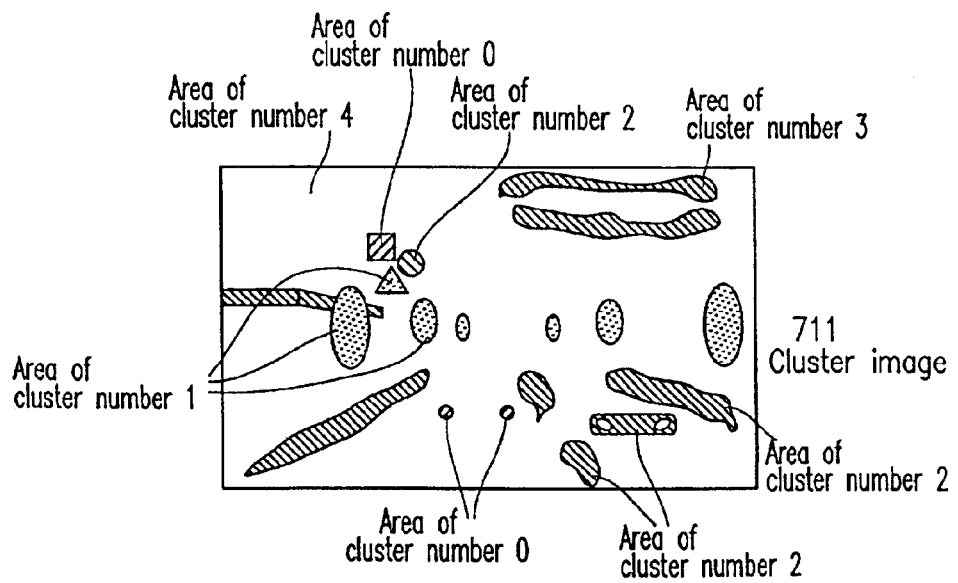
FIG. 7D shows an example of a cluster image generated from the input image by representative color extraction section.

FIG. 7D shows an exemplary cluster image 711 generated from the input image 501 by the representative color area extraction section 201. The cluster image 711 is obtained as a result of assigning a cluster number to a pixel having a non-achromatic color in step 602 and assigning a cluster number to a pixel having an achromatic color in step 605. Each pixel in the input image 501 assigned with a cluster number is stored as a pixel in a cluster image in the memory area acquired in the memory device 109 in step 601.

Step 606: The representative color area extraction section 201 performs a process of combining representative color circumscribing areas.

Figure 8:
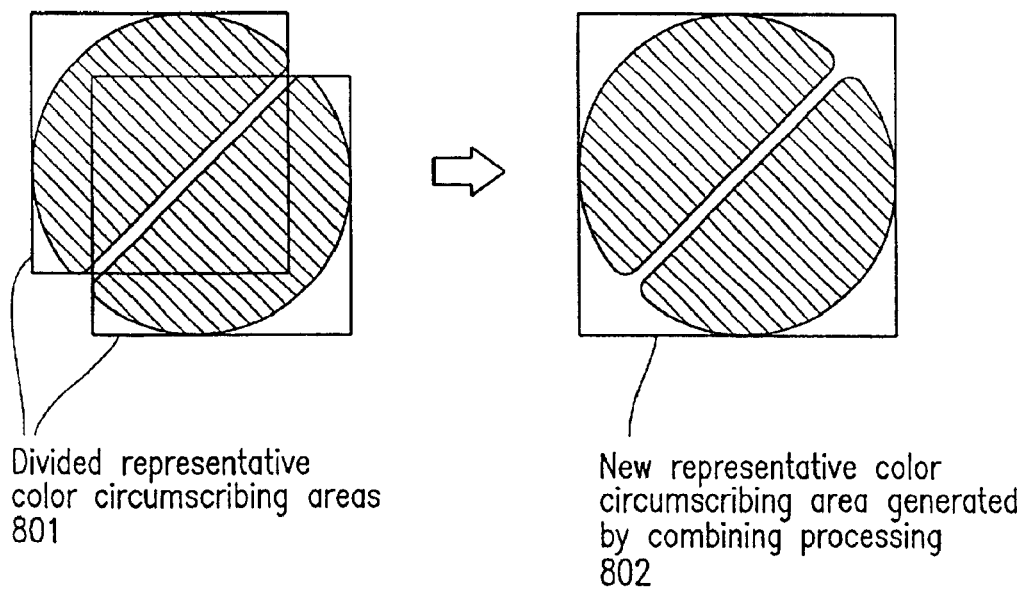
FIG. 8 schematically shows a process for generating one representative color circumscribing area by combining processing performed on divided representative color circumscribing areas.

FIG. 8 schematically shows a process for combining divided representative color circumscribing areas into one representative color circumscribing area. When one representative color circumscribing area is divided into a plurality of areas, the process of combining the plurality of areas into one representative color circumscribing area. In the case where a plurality of divided representative color circumscribing areas 801 have overlapping areas, the profile of the plurality of representative color circumscribing areas 801 in an overlapping state is traced to obtain a circumscribing quadrangular area. Thus, a new representative color circumscribing area 802 is obtained.

The process of combining is performed for two purposes. One purpose regards the binarization in step 604. When the threshold value for the binarization is set to be relatively high, the combining processing is performed in order to avoid the same area from being divided into a plurality of areas. The other purpose is to avoid a representative color area of a target to be detected from being divided into a plurality of areas by occlusion caused by telegraph poles or electric wires, for example. A representative color area an area significantly larger or smaller than or a longer side significantly greater or smaller than a predetermined value has a high possibility of including noise and thus is not made a target for processing.

When there is at least one representative color area obtained by steps 601 through 606, representative color area data representing the obtained representative color area(s) is output to the candidate area extraction section 202, and operation advances to step 607.

Step 607: The candidate area extraction section 202 obtains a candidate area from each of the representative color circumscribing areas obtained by steps 601 through 606. A candidate area is an area possibly including a target (in the first example, the signboard of the gas station). In order to obtain a candidate area, the relative positions of the representative color circumscribing area having the representative color in the cluster image 306 and the frame of the cluster image 306 are used. The representative color circumscribing area of the cluster image 306 is a circumscribing quadrangular area surrounding the representative color area.

Next, a method for obtaining a candidate area will be described in detail.

FIG. 9 schematically shows a process for generating a candidate area from a representative color circumscribing area. As shown in FIG. 9, a representative color circumscribing area 901 which is a circumscribing quadrangular area surrounding an area having a representative color of the cluster image 306 is generated in a manner similar to step 604. An upper left coordinate (0, 0) and a lower right coordinate (mex, mey) define a frame of the cluster image 306. In a coordinate system having the upper left corner of the frame of the cluster image 306 as the origin (0, 0), the side of the frame extending horizontally from the origin as the x axis, and the side of the frame extending vertically from the origin as the y axis, the representative color circumscribing area 901 is represented by a quadrangular area defined by an upper left coordinate (mdsx, mdsy) and a lower right coordinate (mdex, mdey). In the case where the cluster image 306 includes a plurality of representative color circumscribing areas, the representative color circumscribing area having the largest area, for example, may be adopted, although any of the plurality of representative color circumscribing areas may be adopted.

An upper left coordinate and a lower right coordinate of the candidate area is determined using (i) the upper left coordinate (mdsx, mdsy) and the lower right coordinate (mdex, mdey) of the representative color circumscribing area 901 of the cluster image 306 obtained in this manner and (ii) the upper left coordinate (dsx, dsy) and the lower right coordinate (dex, dey) of each of the representative color circumscribing areas 704 of the input image 501 generated in step 604. The upper left coordinate and the lower right coordinate of the candidate area are respectively:

(dsx−zx×mdsx, dsy−zy×mdsy) and (dsx+zx×(mex−mdsx), dsy+zy×(mey−mdsy))

where zx=(dex−dsx+1)/(mdex−mdsx+1), zy=(dey−dsy+1)/(mdey−mdsy+1).

In the above expressions, zx is the ratio between the width in the direction of the x axis of the representative color circumscribing area 901 of the cluster imager 306 and the width in the direction of the x axis of each representative color circumscribing area 704 of the input image 501. Also in the above expressions, zy is the ratio between the height in the direction of the y axis of the representative color circumscribing area 901 of the cluster imager 306 and the height in the direction of the y axis of each representative color circumscribing area 704 of the input image 501.

The two ratios (i.e., the width ratio in the x axis direction and the height ratio in the y axis direction) are used for two reasons. One reason is that an image captured by a camera is distorted in a peripheral area thereof due to the angle of view of the lens used, and therefore may be expanded or reduced by different ratios in the x axis direction and the y axis direction depending on the position in the image. The other reason is that when a signboard is angled with respect to the camera, for example, the ratio between the height and the width of the obtained image is possibly different from that of the model. In the case where the degree of distortion is about the same in the x axis direction and the y axis direction (i.e., in the case where the degree of distortion is about the same in the directions from the center of the image toward the upper left, upper right, lower left and lower right corners of the image), the ratio between the height and the width of the obtained image is considered to be equal to that of the model. In this case, one of zx or zy can be used since it can be regarded as zx=zy. When the height in they axis direction is greater than the width in the x axis direction in the representative color circumscribing area 704 of the input image 501, zy is used; and when the width in the x axis direction is greater than the height in the y axis direction, zx is adopted. Adopting one of the ratios in this manner is effective when the target to be detected is occluded by a telegraph pole or the like.

FIG. 10 schematically shows another process for generating a candidate area from a representative color circumscribing area. An input image 1701 shown in FIG. 10 is the same as the input image 501 shown in FIG. 6A except that the target to be detected, i.e., the signboard 502 of the gas station is occluded by a telegraph pole 1702 and thus is divided into a left portion and a right portion. A portion of the representative color area of the input image 1701 is occluded by the telegraph pole 1702. Performing steps 601 through 606 on the input image 1701 results in a representative color circumscribing area 1704 which has a portion thereof lacking as shown in FIG. 10.

In this case, the size of the original signboard 502 cannot be correctly calculated from the width in the x axis direction of the representative color circumscribing area 1704. However, the size of the original signboard 502 can be correctly calculated using the height in the y axis direction (which is highly possibly greater than the width in the x axis direction divided by the telegraph pole 1702). In the case of the representative color circumscribing area 1704 shown in FIG. 10 obtained from the input image 1701, the height in the y axis direction is greater than the width in the x axis direction. Therefore, zy is adopted.

When zy is adopted, an upper left coordinate and a lower right coordinate of a first candidate area 1703 are:

(dsx−zy×mdsx, dsy−zy×mdsy), and (dsx+zy×(mex−mdsx), dsy+zy×(mey−mdsy)).

An upper left coordinate and a lower right coordinate of a second candidate area 1705 are:

(dex−zy×mdex, dsy−zy×mdsy), and (dex+zy×(mex−mdex), dsy+zy×(mey−mdsy).

In FIG. 10, the first candidate area 1703 is shown with a solid line, and the second candidate area 1705 is shown with a dotted line.

In the case where the representative color circumscribing area 1704 is divided into an upper portion and a lower portion by occlusion, zx is adopted. When zx is adopted, an upper left coordinate and a lower right coordinate of a first candidate area (not shown) are:

(dsx−zx×mdsx, dsy−zx×mdsy), and (dsx+zx×(mex−mdsx), dsy+zx×(mey−mdsy)).

An upper left coordinate and a lower right coordinate of a second candidate area (not shown) are:

(dsx−zx×mdsx, dey−zx×mdey), and (dsx+zx×(mex−mdsx), dey+zx×(mey−mdey)).

Two candidate areas are obtained from one representative color circumscribing area 1704 for two reasons. One reason is that it is not known which portion of the area to be the representative color circumscribing area of the input image 1701 is occluded. When zy is adopted, candidate areas are obtained based on the left side and the right side of the representative color circumscribing area 1704 generated from the input image 1701. When zx is adopted, candidate areas are obtained based on the upper side and the lower side of the representative color circumscribing area 1704 generated from the input image 1701. The other reason is since there is a possibility that one of the lines of the representative color circumscribing area, based on which a candidate area is obtained, does not necessarily correspond to the actual line of the representative color circumscribing area due to noise or the like, another candidate area is obtained based on the other line, so that the actual target is necessarily included in one of the candidate areas.

The candidate area extraction section 202 outputs candidate area data representing candidate areas 903 (FIG. 9) obtained in this manner to the comparison section 203, and operation proceeds to step 608.

In the above-described manner, a representative color area having substantially the same color as the representative color is extracted regardless of the shape of the area having the representative color of the target data unit in the input image. Using the relative positions of the area having the representative color in the cluster image and the frame of the cluster image, the candidate areas which possibly include the target can be obtained, regardless of the size of the target in the input image.

Step 608: The comparison section 203 compares each of the candidate areas 903 obtained in step 607 and the cluster image 306.

In steps 601 through 607, areas possibly including the target in the input image 501 are obtained utilizing the representative color represented by the representative color data included in the target data unit 401a. Next, it is determined whether or not the candidate areas 903 include the target to be detected, using the used color data included in the target data unit 401a (in the first example, cluster numbers 0 through 2 and 4) and the cluster image 306 (FIG. 3).

The comparison section 203 calculates an inter-image distance D between an image in the cluster image 711 (FIG. 7D) corresponding to each candidate area 903 generated in step 607 and the cluster image 306 (FIG. 3) in accordance with the method described below. When the resultant inter-image distance D is smaller than a predetermined threshold value Td, the corresponding candidate area 903 is detected by the comparison section 203 as an area including the target. In the case where there are a plurality of inter-image distances D smaller than the threshold value Td, a candidate area corresponding to the shortest inter-image distance D may be detected as an area including the target. Each candidate area 903 and the cluster image 306 do not necessarily have the same size. Accordingly, before performing the comparison, the size is normalized based on one of the candidate area 903 and the cluster image 306. When the normalization is performed based on the candidate area 903, the pixel value of the post-normalization cluster image 306 is interpolated so as to match the pixel value of the pre-normalization cluster image 306. Thus, the number of pixels of the post-normalization cluster image 306 matches the number of pixels of the candidate area 903. When the normalization is performed based on the cluster image 306, the pixel numbers and the pixel values are interpolated similarly. In the operation described below, the candidate area 903 is normalized based on the cluster image 306. Therefore, the number of pixels of the candidate area 903 match the number of pixels of the cluster image 306. When the candidate area 903 and the cluster image 306 have the same size, the above-described processing is omitted.

Figure 11:
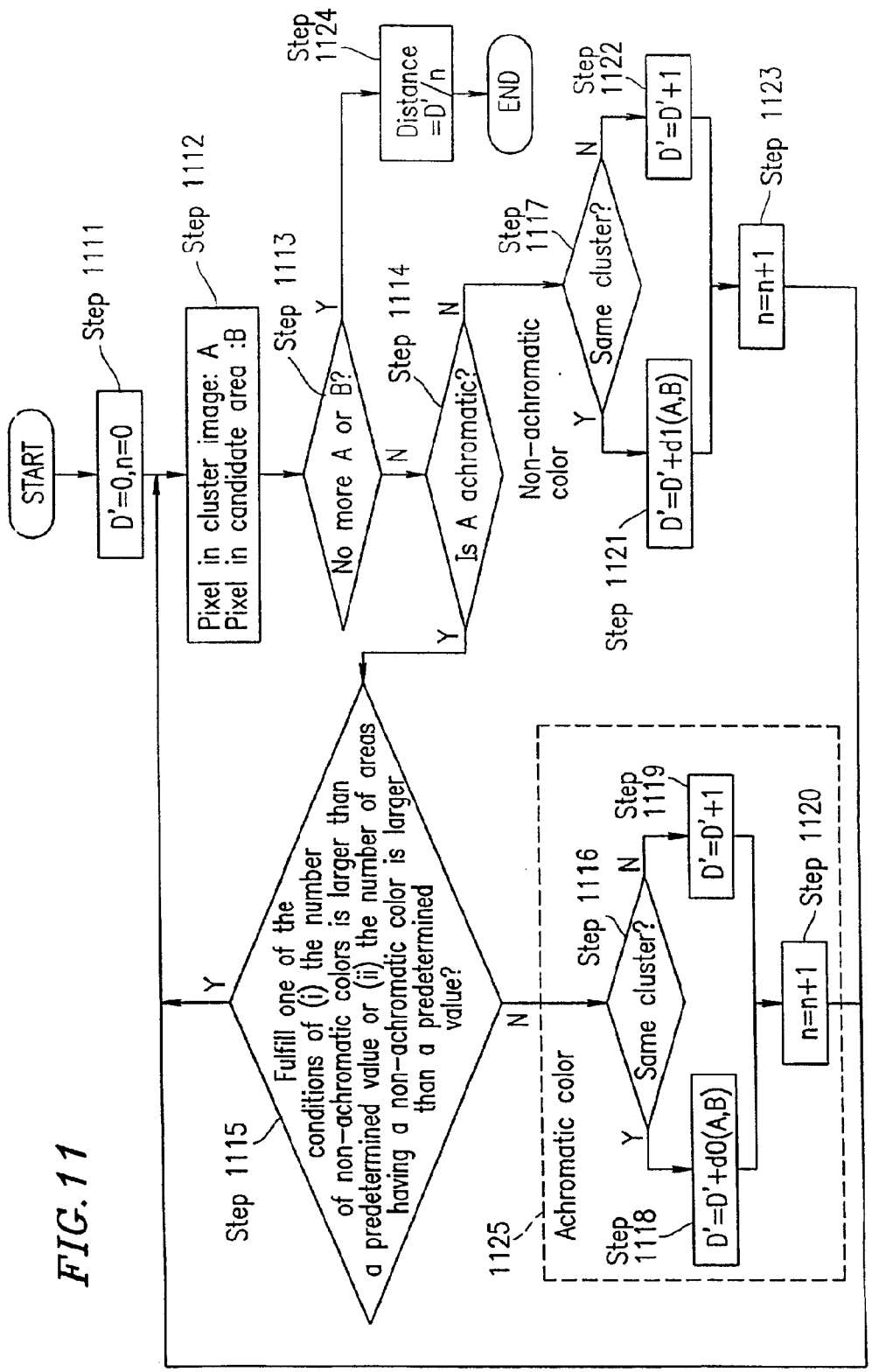
FIG. 11 shows a process for obtaining an inter-image distance D between a cluster image and a candidate area.

FIG. 11 shows a process for obtaining the inter-image distance D between the cluster image 306 and the candidate area 903. The inter-image distance D is obtained as shown in the following expression. Specifically, an inter-pixel distance d (distance between pixel A in the cluster image 306 and pixel B in the candidate area 903 corresponding to pixel A) is obtained, and the inter-pixel distances d of all pixels in the cluster image 306 are summed (D'=Σd). The sum is divided by the number of pixels (n) used for the addition. Thus, the inter-image distance D is obtained as shown in expression (1) below. The inter-pixel distances d will be described below in detail.

$$D = D'/\text{number of pixels } (n) \qquad \text{expression (1)}$$

Step 1111: 0 is substituted for D' of expression (1), and 0 is substituted for n.

Step 1112: Pixel A in the cluster image 306 and pixel B of the candidate area 903 are extracted.

Step 1113: It is determined whether or not there is still one or more pixels to be compared in the cluster image 306. When there is no pixel to be compared in the cluster image 306, operation advances to step 1124. When there is still one or more pixels to be compared in the cluster image 306, operation advances to step 1114.

Step 1114: It is determined whether or not pixel A in the cluster image 306 is of an achromatic color. When pixel A in the cluster image 306 is of an achromatic color, operation advances to step 1115. When pixel A in the cluster image 306 is of a non-achromatic color, operation advances to step 1117.

Step 1115: It is determined whether or not the cluster image 306 fulfills one of the conditions of (i) the number of non-achromatic colors in the cluster image 306 is larger than a first predetermined value or (ii) the number of areas having a non-achromatic color in the cluster image 306 is larger than a second predetermined value. When the number of non-achromatic colors in the cluster image 306 is larger than the first predetermined value or the number of areas having a non-achromatic color in the cluster image 306 is larger than the second predetermined value, operation returns to step 1112 without obtaining the inter-pixel distance d between a pixel of an achromatic color in the cluster image 306 and the corresponding pixel in the candidate area 903. When the number of non-achromatic colors in the cluster image 306 is equal to or smaller than the first predetermined value and the number of areas having a non-achromatic color in the cluster image 306 is equal to or smaller than the second predetermined value, operation advances to step 1116 in order to obtain the inter-pixel distance d between a pixel of an achromatic color in the cluster image 306 and the corresponding pixel in the candidate area 903.

Step 1116: It is determined whether or not the cluster number of pixel A in the cluster image 306 matches the cluster number of the corresponding pixel B in the candidate area 903. The cluster number of pixel B is obtained from the cluster image 711 in FIG. 7D. When the cluster number of pixel A matches the cluster number of the corresponding pixel B, operation advances to step 1118. When the cluster number of pixel A does not match the cluster number of the corresponding pixel B, operation advances to step 1119.

Step 1118: D' is increased by d0 (A, B), which is an inter-pixel distance between pixel A having an achromatic color (achromatic color area) in the cluster image 306 and the corresponding pixel B in the candidate area 903.

Step 1119: D' is increased by 1. The inter-pixel distance between pixel A and pixel B is 1.

Step 1120: n is increased by 1.

When step 1120 is completed, operation returns to step 1112, and the operation loop is repeated.

Step 1117: It is determined whether or not the cluster number of pixel A in the cluster image 306 matches the cluster number of the corresponding pixel B in the candidate area 903. Step 1117 is similar to step 1116. When the cluster number of pixel A matches the cluster number of the corresponding pixel B, operation advances to step 1121. When the cluster number of pixel A does not match the cluster number of the corresponding pixel B, operation advances to step 1122.

Step 1121: D' is increased by d1 (A, B), which is an inter-pixel distance between pixel A in an area having a non-achromatic color (non-achromatic color area) in the cluster image 306 and the corresponding pixel B in the candidate area 903.

Step 1122: D' is increased by 1. The inter-pixel distance between pixel A and pixel B is 1.

Step 1123: n is increased by 1. Step 1123 is similar to step 1120.

When step 1123 is completed, operation returns to step 1112, and the operation loop is repeated. When there is no pixel to be compared in the cluster image 306 in step 1113, operation advances to step 1124.

Step 1124: The inter-image distance D is obtained in accordance with expression (1).

The inter-image distance D is obtained by performing steps 1111 through 1124. When, in step 1115, the number of non-achromatic colors in the cluster image 306 is larger than a first predetermined value, or the number of areas having a non-achromatic color in the cluster image 306 is larger than a second predetermined value, the steps for obtaining the inter-pixel distance d between the pixel having an achromatic color in the cluster image 306 and the corresponding pixel in the candidate area 903 (surrounded by dashed line 1125) may be omitted. In the first example, the number of the non-achromatic colors is 3 (clusters 0 through 2) based on the target data unit 401a (FIG. 4), and the number of areas having a non-achromatic color in the cluster image 306 is 3. The first predetermined value and the second predetermined value may be each 1, for example. The first predetermined value and the second predetermined value may be different from each other.

It is effective to determine, based on the number of non-achromatic colors or the number of areas having a non-achromatic color in the cluster image 306, whether or not pixels having an achromatic color in the cluster image 306 (achromatic color area) should be considered. It is advantageous to obtain the inter-image distance D between the cluster image 306 and a candidate area 903 without relying on the inter-pixel distance d between a pixel having an achromatic color in the cluster image 306 and the corresponding pixel in the candidate area 903, for the following reason. An influence of an optical system of a camera, image processing or the like blurs a periphery of the achromatic area so as to be non-achromatic. Thus, an actual achromatic area does not appear achromatic in an image, which adversely affects image detection. When the first predetermined value and the second predetermined value are each 1 (for example, when the target to be detected is the national flag of Japan including the red rising sun against the white background, i.e., when the number of non-achromatic colors is 1 (red) and the number of non-achromatic areas is 1 (red area) in the cluster image), an inter-image distance D obtained without considering the achromatic area may cause such an inconvenience that all the red, circular objects (for example, such as a red lamp of a traffic signal) are detected. In such a case, the comparison is performed utilizing the feature of an achromatic area having "low chroma". Thus, the detection precision of the image detection apparatus 107 is improved, and the national flag of Japan, for example, can be detected accurately.

Hereinafter, the inter-pixel distance d used in expression (1) will be described. The inter-pixel d can be defined in a plurality of ways both in the case where pixel A of interest in the cluster image 306 is of an achromatic color and in the case where pixel A of interest in the cluster image 306 is of an non-achromatic color. These two cases will be described separately.

(1) In the case where pixel A is of an achromatic color (in the first example, in the case where pixel A is assigned cluster number 4), the inter-pixel distance d0 (A, B) between pixel A and pixel B is obtained in one of the following two methods.

1. When the cluster number of pixel A in the cluster image 306 matches the cluster number of the corresponding pixel B in the candidate area 903, 0 is substituted for d0 (A, B). When the two cluster numbers do not match each other, 1 is substituted for d0 (A, B).

2. When the cluster number of pixel A in the cluster image 306 matches the cluster number of the corresponding pixel B in the candidate area 903, a distance (inter-normalized luminance distance) between the normalized luminance of pixel B in the candidate area 903 and the normalized luminance distribution 307 (cluster 4 in FIG. 3) is substituted for d0 (A, B). When the two cluster numbers do not match each other, 1 is substituted for d0 (A, B). The normalized luminance of pixel B in the candidate area 903 is obtained by dividing the luminance value of a corresponding pixel B in the input image 501 by the average luminance of the representative color area in the candidate area 903. The inter-normalized luminance distance is obtained by dividing the Mahalanobis distance between the normalized luminance of pixel B and the normalized luminance distribution 307 by the maximum distance 305 in the normalized luminance distribution 307. When the inter-normalized luminance distance exceeds 1, 1 is substituted for d0 (A, B).

The luminance value of a pixel is liable to be influenced by a condition of a light source when the image is captured. In the case where the condition of the light source (for example, brightness of the light source) is different between when the target image is captured and when the input image is captured, the average luminance of the representative color area in the target image and the average luminance of the representative color area in the input image show different values in accordance with the difference in the condition at the time of image capturing. The influence of the light source can be cancelled by normalizing the luminance value of pixels having an achromatic color by the average luminance of the representative color area.

Either one of the above two methods (1) and (2) can be used. Method (2) achieves high precision detection for the above-described reason.

(2) In the case where pixel A is of a non-achromatic color (in the first example, in the case where pixel A is assigned one of cluster numbers 0 through 2), the inter-pixel distance d1 (A, B) between pixel A and pixel B is obtained in one of the following three methods. Any one of the three methods is usable.

1. When the cluster number of pixel A in the cluster image 306 matches the cluster number of the corresponding pixel B in the candidate area 903, 0 is substituted for d1 (A, B). When the two cluster numbers do not match each other, 1 is substituted for d1 (A, B).

2. When the cluster number of pixel A in the cluster image 306 matches the cluster number of the corresponding pixel B in the candidate area 903, a value, which is obtained by subtracting the pixel value of a pixel in the similarity image 503 (FIG. 6A) corresponding to pixel B in the candidate area 903 (the pixel value is the similarity) from 1, is substituted for d1 (A, B). When the two cluster numbers do not match each other, 1 is substituted for d1 (A, B).

3. When the cluster number of pixel A in the cluster image 306 matches the cluster number of the corresponding pixel B in the candidate area 903, a value, which is obtained by dividing an absolute value of a difference between hue values of pixels A and B by $\pi$, is substituted for d1 (A, B). When the two cluster numbers do not match each other, 1 is substituted for d1 (A, B).

According to any one of methods (2) 1 through 3, the inter-pixel distance is obtained based on the hue of each pixel in the cluster image 306 and the hue of each pixel in a candidate area 903.

An image detection apparatus according to the present invention can detect a traffic signal as well as a sign or a signboard. A traffic signal uses red, green and yellow lamps, which have the determined positional relationship. The lamps are also circular. The non-achromatic colors used in the traffic signal are red, green and yellow. As described above, for detecting a traffic signal, only the hue and chroma are used, and the luminance is not used. Therefore, it cannot be determined which of the colored lamps is lit up. Which of the colored lamps is now lit up can be determined as follows. An average of the luminance values of the pixels belonging to each of red, green and yellow colors is obtained. The color having the highest average luminance value is specified as being lit up. By using the three colors of red, green and yellow, an erroneous detection of a red tail lamp of an automobile being the red lamp of the traffic signal can be avoided, which may undesirably occur when only one color is used for detection. For detecting a traffic signal, a combination of red and yellow may be one color (i.e., one cluster value), and this combined color and green may be used for detection.

For obtaining a target data unit of a target image, one of the used colors having the highest average chroma is used as the representative color. The present invention is not limited to this, and a plurality of used colors may be utilized as the representative colors. In such a case, the used colors are used from the color having the highest average chroma as the representative colors. The maximum distance 305 (FIG. 3) of each cluster of each used color included in the target data unit is considered as the maximum value of the distances between the center of the cluster and the hue of the pixels belonging to the cluster. The present invention is not limited to this, and the maximum distance 305 may be obtained based on a variance which is twice or three times the square root of the variance 304. In the case of a non-achromatic area, $\pi$ may be used as the maximum distance 305.

For obtaining the target data unit of the target image, one cluster value is assigned to an achromatic area. The present invention is not limited to this, and a plurality of cluster values may be assigned to the achromatic area by clustering the normalized luminance distribution thereof. In this case, a target including achromatic areas having different luminance values can be detected efficiently.

In step 603, in order to generate a representative color image, each pixel value of the similarity image 503 is multiplied by a corresponding pixel value corresponding to a chroma image. In order to detect a target which emits light (for example, a signboard of a gas station or a convenience store) from a dark image captured at night or the like, each pixel value in the similarity image 503 may be multiplied by a corresponding pixel value in a luminance image. Each pixel value in the similarity image 503 may be multiplied by a corresponding pixel value in the luminance image and a corresponding pixel value in the chroma image 702. The luminance image represents only the luminance of each pixel among the three pixel values of the input image 501. By using the luminance in this manner, a representative color area which cannot be properly obtained with only a similarity image (for example, an image captured at night) can be accurately obtained. In this case also, the representative color area has substantially the same color as the representative color (an area including pixels having substantially the same color as the representative color). In this example, the expression "having substantially the same as the representative color" means that (the similarity of the pixel with the cluster of the representative color)×(the luminance of the pixel) or (the similarity of the pixel with the cluster of the representative color)×(the chroma of the pixel)×(the luminance of the pixel) is equal to or higher than the threshold value.

In step 604, the representative color circumscribing area 704 is obtained by determining a representative color area from a binarized image of the representative color image and then tracing the profile of the representative color area. Alternatively, the representative color circumscribing area 704 may be obtained by using, as a representative color area, an area having a cluster value representing the representative color in the cluster image 711 in FIG. 7D (in the first example, cluster number 2) and also having a pixel having a chroma of 0.25 or higher (non-achromatic color) in the chroma image 702, and then tracing the profile of the representative color area.

The process of combining the representative color circumscribing areas performed in step 606 may be performed as follows. Each representative color circumscribing area is expanded in upper, lower, right and left directions by a certain number of pixels (for example, 1 through 3 pixels), and the expanded representative color circumscribing areas are combined. The resultant representative color circumscribing area is reduced to the upper, lower, right and left directions by a certain number of pixels. The resultant representative color circumscribing area is used as a new resultant representative color circumscribing area. The process of combining in step 606 is not absolutely necessary, and can be omitted.

In the case where a road sign showing the direction to a destination is provided with a different shape depending on the site of installment, the representative color circumscribing area 704 obtained by the representative color area extraction section 201 is made a candidate area 903 for such a road sign. Therefore, it is effective to use only the representative color area extraction section 201 without using the candidate area extraction section 202, the comparison section 203 or the database 204.

EXAMPLE 2

Figure 12:
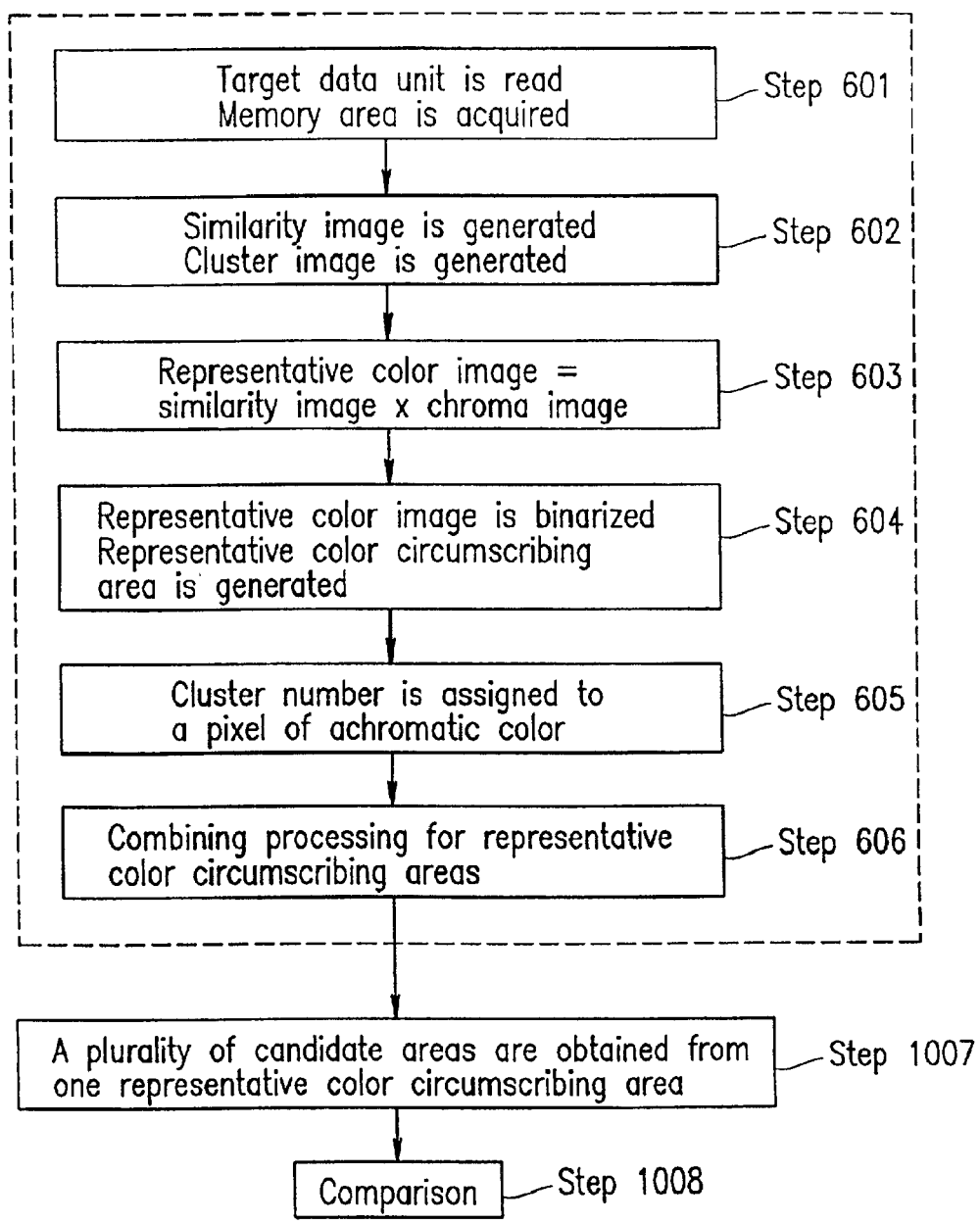
FIG. 12 shows a flow of another program for allowing a computer to act as an image detection apparatus according to the present invention.

FIG. 12 shows a flow of another program for allowing a computer to act as the image detection apparatus 107 (FIG. 2) according to a second example of the present invention. The function of the candidate area extraction section 202 (FIG. 2) corresponds to step 1007 shown in FIG. 12, and the function of the comparison section 203 (FIG. 2) corresponds to step 1008. Steps 601 through 606 shown in FIG. 12 are the same as steps 601 through 606 shown in FIG. 6, and will not be described here.

With reference to FIG. 12, the program according to the second example will be described.

Step 1007: The candidate area extraction section 202 obtains a plurality of candidate areas from each of the representative color circumscribing areas obtained by steps 601 through 606.

Figure 13:
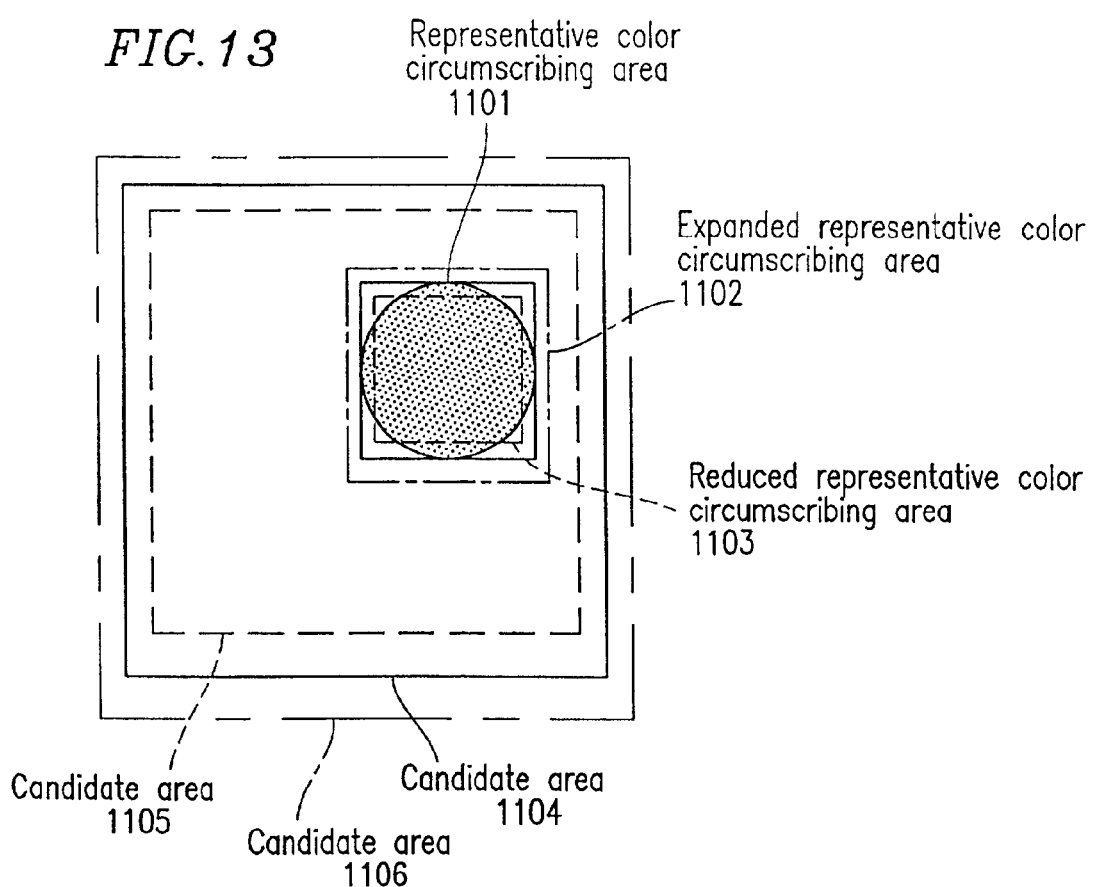
FIG. 13 schematically shows a process for generating a plurality of candidate areas from one representative color circumscribing area.

FIG. 13 schematically shows a process for generating a plurality of candidate areas from one representative color circumscribing area. The candidate area extraction section 202 receives the representative color area data generated by steps 601 through 606, and expands and reduces each of the representative color circumscribing areas represented by the representative color area data in upper, lower, right and left directions by a certain number of pixels (for example, one pixel). Thus, three representative color circumscribing areas are generated for each of the representative color circumscribing areas obtained by steps 601 through 606. FIG. 13 shows one representative color circumscribing area 1101 obtained by steps 601 through 606, a representative color circumscribing area 1102 obtained by expanding the representative color circumscribing area 1101 in the upper, lower, right and left directions by one pixel, and a representative color circumscribing area 1103 obtained by reducing the representative color circumscribing area 1101 in the upper, lower, right and left directions by one pixel.

Then, a candidate area is obtained from each representative color circumscribing area in a manner similar to step 607 in FIG. 5. FIG. 13 also shows a candidate area 1104 obtained from the representative color circumscribing area 1101, a candidate area 1106 obtained from the expanded representative color circumscribing area 1102, and a candidate area 1105 obtained from the reduced representative color circumscribing area 1103.

The candidate area extraction section 202 outputs candidate area data representing the candidate areas 1104, 1105 and 1106 obtained in this manner to the comparison section 203, and operation advances to step 1008.

Step 1008: The comparison section 203 compares each of the candidate areas 1104, 1105 and 1106 obtained in step 1007 with the cluster image 306. An inter-image distance between a cluster image of each of the candidate areas 1104, 1105 and 1106 and the cluster image 306 is obtained in a manner similar to that of the first example. When the shortest inter-image distance among the obtained three inter-image distances is smaller than the threshold value Td, the candidate area corresponding to the shortest inter-image distance is detected as an area including the target. When all of the inter-image distances are larger than the threshold value Td, the comparison section 203 determines that none of the three candidate areas includes the target.

In step 1007, the representative color circumscribing areas obtained by steps 601 through 606 are expanded and reduced in the upper, lower, right and left directions by a certain number of pixels. Alternatively, the representative color circumscribing areas may only be expanded and/or reduced. The number of pixels by which the expansion and reduction is performed in not limited to 1, and may be any number. For example, the representative color circumscribing areas may be expanded and/or reduced by 2 or 3 pixels in accordance with the performance of the camera (especially, with respect to the degree of blur). The representative color circumscribing areas may be expanded and/or reduced a plurality of times, instead of once.

In the second example, candidate areas obtained from representative color circumscribing areas generated by expanding and/or reducing each of the representative color circumscribing areas obtained by steps 601 through 606 are also considered. Therefore, in the case where the size of the candidate area actually including the target cannot be accurately found due to color blurring, fainting or the like caused at a peripheral portion of the representative color circumscribing areas by an optical system of the camera, image processing or the like, the target can be accurately detected without reducing the detection precision.

EXAMPLE 3

Figure 14:
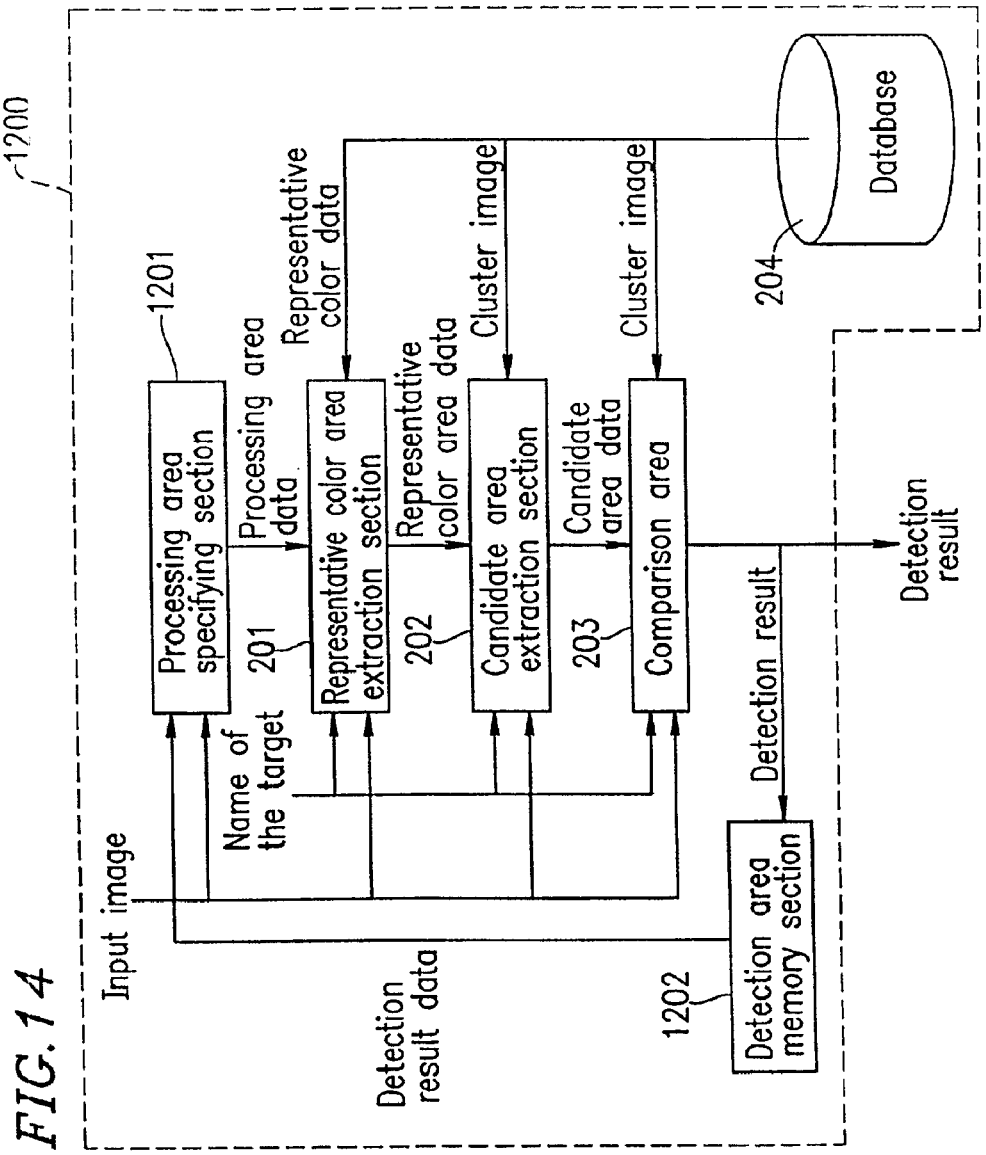
FIG. 14 shows an exemplary structure of an image detection apparatus according to the present invention.

FIG. 14 shows an exemplary structure of an image detection apparatus 1200 according to a third example of the present invention.

The image detection apparatus 1200 includes a processing area specifying section 1201 and a detection area memory section 1202 in addition to the representative color area extraction section 201, the candidate area extraction section 202, the comparison section 203, and the database 204 also included in the image detection apparatus 107 (FIG. 2). Identical elements previously discussed with respect to FIG. 2 bear identical reference numerals and the detailed descriptions thereof will be omitted.

The detection area memory section 1202 stores a detection result which associates a detection area as the detection result obtained by the comparison section 203 with time. When the comparison section 203 finishes comparison, the detection area memory section 1202 stores the detection area associated with time in the detection area memory section 1202 itself and erases the longest held detection area among the detection areas stored therein. Association of the detection area with time may be an association of the detection area with time t at which the input image was captured, or an association of the detection area with the number of frames of the input image since the input image was begun to be input. The detection result stored in the detection area memory section 1202 is, for example, coordinate data representing the position of an area including the target detected in the input image which was captured at time t.

In the following description, the detection area memory section 1202 is set to store three detection areas, i.e., a detection area of an input image captured at latest time t, a detection area of an input image captured at time 2t, and a detection area of an input image captured at earliest time 3t. The detection area memory section 1202 can be set to store two or more detection areas. Also in the following description, the detection area memory section 1202 stores a detection area of each of a plurality of input images continuously captured at a certain time (for example, captured at time t, then 2t, and then 3t). Alternatively, the detection area memory section 1202 may store a detection area of each of a plurality of input images captured at an arbitrary time.

When an input image is input to the processing area specifying section 1201 via the image input section 102 (FIG. 1), the processing area specifying section 1201 reads detection result data representing three detection areas stored in the detection area memory section 1202. Using the detection result data, the processing area specifying section 1201 determines whether or not the positional relationship between at least two detection areas represented by the detection result data fulfill a predetermined condition. When the at least two detection areas represented by the detection result data fulfill the predetermined condition, the processing area specifying section 1201 specifies the detection area and an area proximate thereto, among the at least two detection areas, which is associated with the latest time as an area to be processed (processing area). When the at least two detection areas represented by the detection result data do not fulfill the predetermined condition, the processing area specifying section 1201 specifies the entire input image as a processing area. The processing area specifying section 1201 then outputs processing area data representing the specified processing area to the representative color area extraction section 201. The processing area data is, for example, coordinate data representing the position of the processing area in the input image.

The input device 103 (FIG. 1) inputs information specifying the target to be detected in the input image (for example, the name of the target) to the representative color area extraction section 201, the candidate area extraction section 202, and the comparison section 203. Thereafter, the operation is performed in a manner similar to that of the first example.

Figure 15:
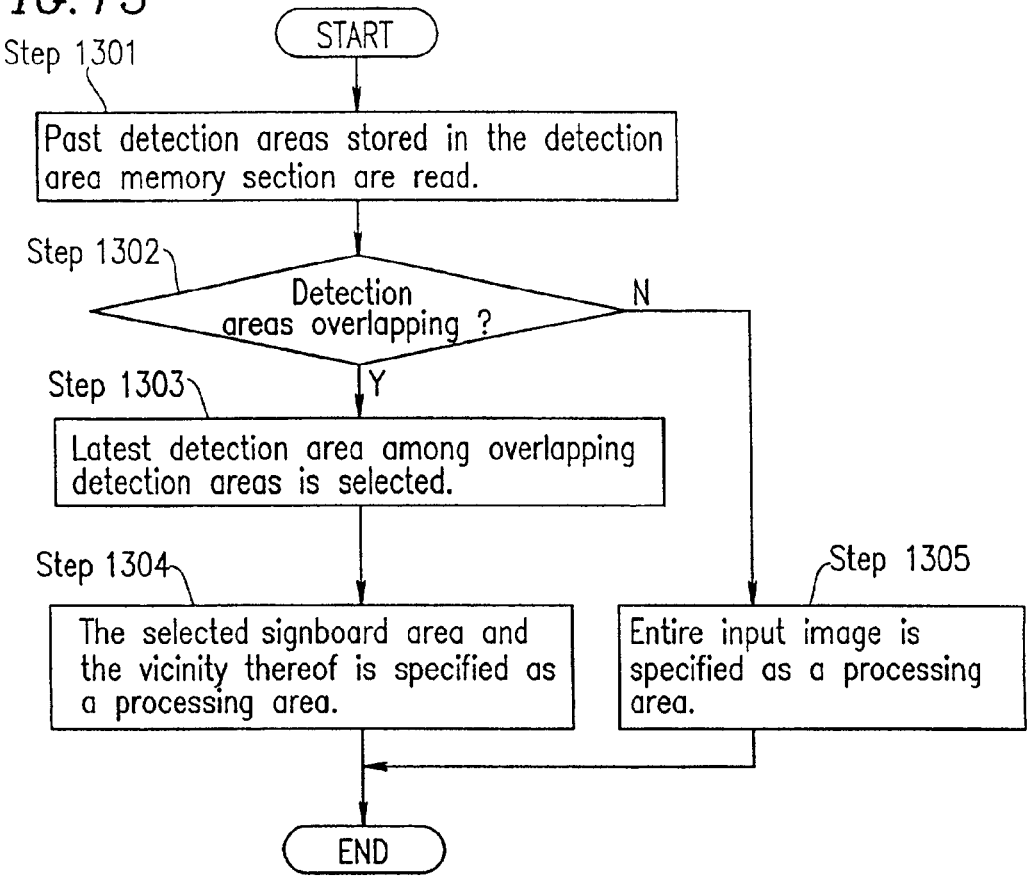
FIG. 15 shows a flow of a part of still another program for allowing a computer to act as an image detection apparatus according to the present invention.

FIG. 15 shows a portion of a flow of a program for allowing a computer to act as the image detection apparatus 1200.

Figure 16:
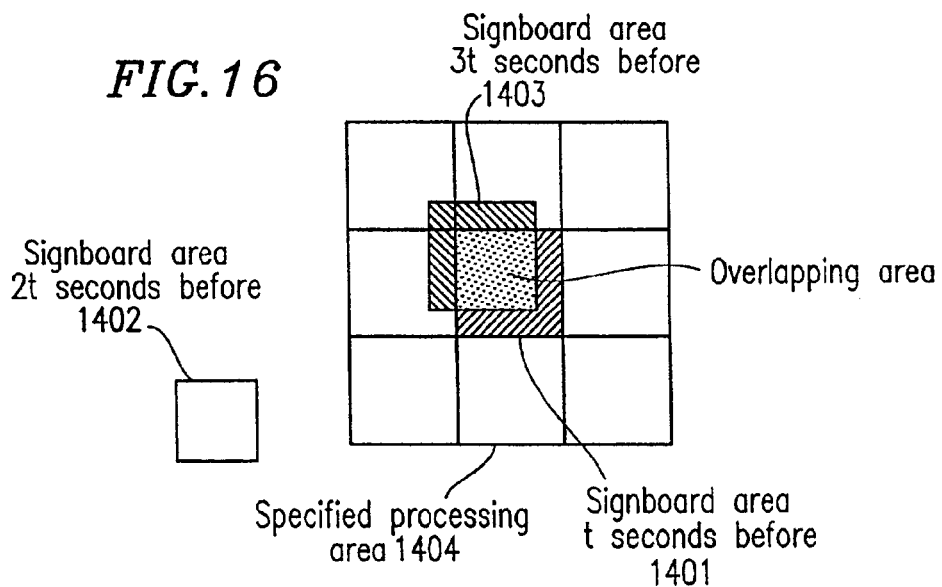
FIG. 16 schematically shows a process for specifying a processing area in an input image based on past detection results.

FIG. 16 schematically shows a process for specifying a processing area in the input image based on past detection results. With reference to FIGS. 15 and 16, the function of the processing area specifying section 1201 will be described.

Step 1301: The processing area specifying section 1201 reads three past detection areas stored in the detection area memory section 1202. As shown in FIG. 16, the detection areas are a signboard area 1401 in which the signboard is present in an input image captured t seconds before, a signboard area 1402 in which the signboard is present in an input image captured 2t seconds before, and a signboard area 1403 in which the signboard is present in an input image captured 3t seconds before.

Step 1302: The processing area specifying section 1201 determines whether or not at least two of the three signboard areas 1401 through 1403 read as the past detection results overlap each other. When it is determined that at least two of the three signboard areas 1401 through 1403 overlap each other, operation advances to step 1303. When it is determined that none of the three signboard areas 1401 through 1403 overlap each other, operation advances to step 1305. In FIG. 16, the signboard area 1401 captured t seconds before and the signboard area 1403 captured 3t seconds before overlap each other.

In this example, it is determined in step 1302 whether or not at least two of the three signboard areas 1401 through 1403 overlap each other. Alternatively, it may be determined whether or not at least two of the three signboard areas 1401 through 1403 are close to each other. Herein, the expression "close to each other" means that, for example, the distance between the centers of the two signboard areas is smaller than a predetermined value (for example, a length of one side of the signboard area). In this manner, in step 1302, the processing area specifying section 1201 determines whether or not the positional relationship of the signboard areas (for example, presence of an overlapping portion or distance between the centers) fulfill an arbitrary condition.

Hereinafter, an operation performed on the result that at least two among the three signboard areas overlap each other will be described.

Step 1303: The processing area specifying section 1201 selects a detection area, among the overlapping signboard areas, which is captured at a latest time. In FIG. 16, the signboard area 1401 of the input image captured t seconds before is selected among the overlapping signboard areas 1401 and 1403.

Step 1304: The processing area specifying section 1201 specifies a processing area 1404 (FIG. 16) in the current input image based on the selected past signboard area 1401. The processing area 1404 includes the selected signboard area 1401 and areas obtained by translating the signboard area 1401 in upper, lower, right, left, upper right, upper left, lower right and lower left directions. The method for specifying the processing area is not limited to this. For example, an area obtained by expanding the signboard area 1401 selected in step 1303 by one pixel can be used as a processing area.

Step 1305: When it is determined that none of the past signboard areas overlaps each other in step 1302, the processing area specifying section 1201 specifies the entire current input image as the processing area.

After step 1304 or 1305, the operation is performed in a manner similar to that described in the first example with reference to FIG. 5, so as to detect the target.

In the third example, the detection area memory section 1202 stores at least two detection areas obtained by the comparison section 203 in association with time. The processing area specifying section 1201 specifies a processing area in the current input image based on the detection areas stored in the detection area memory section 1202. Thus, an area possibly including the target can be specified from the current input image. Since the processing area thus obtained is processed, the processing time is shortened, resulting in an increase in the processing speed.

EXAMPLE 4

Figure 17:
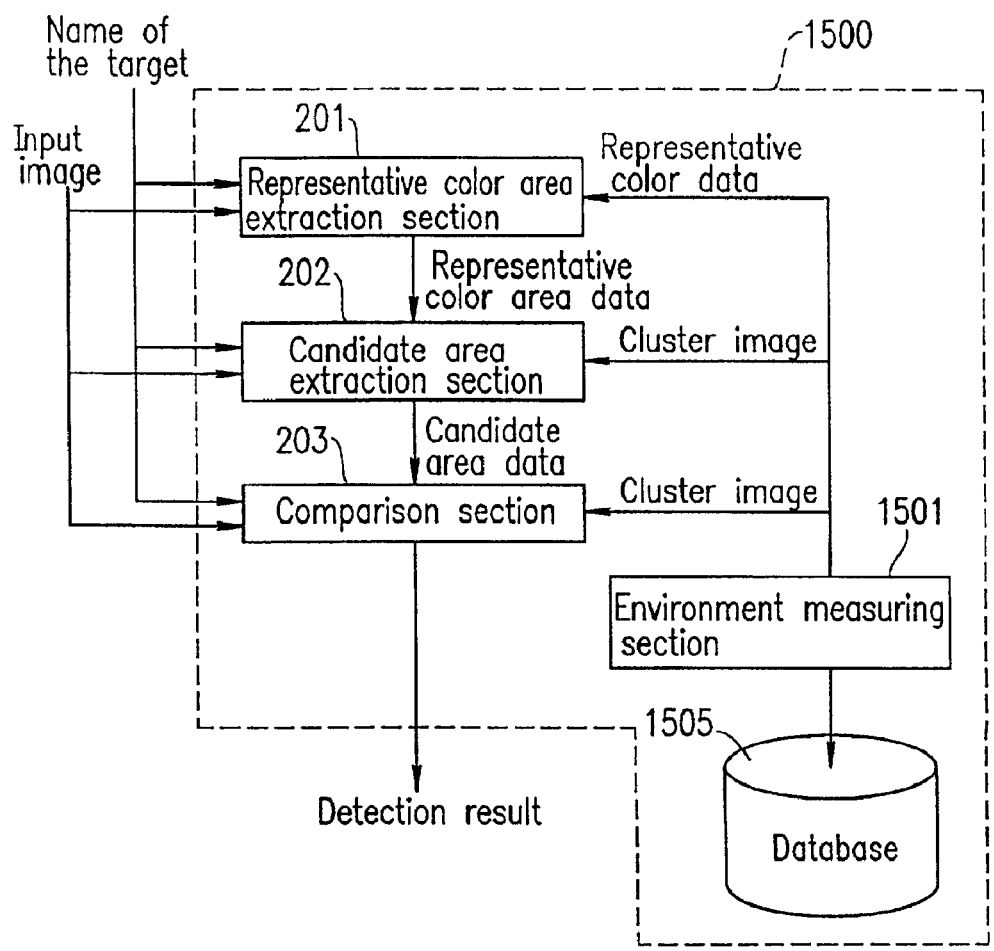
FIG. 17 shows an exemplary structure of an image detection apparatus according to the present invention.
Figure 19:
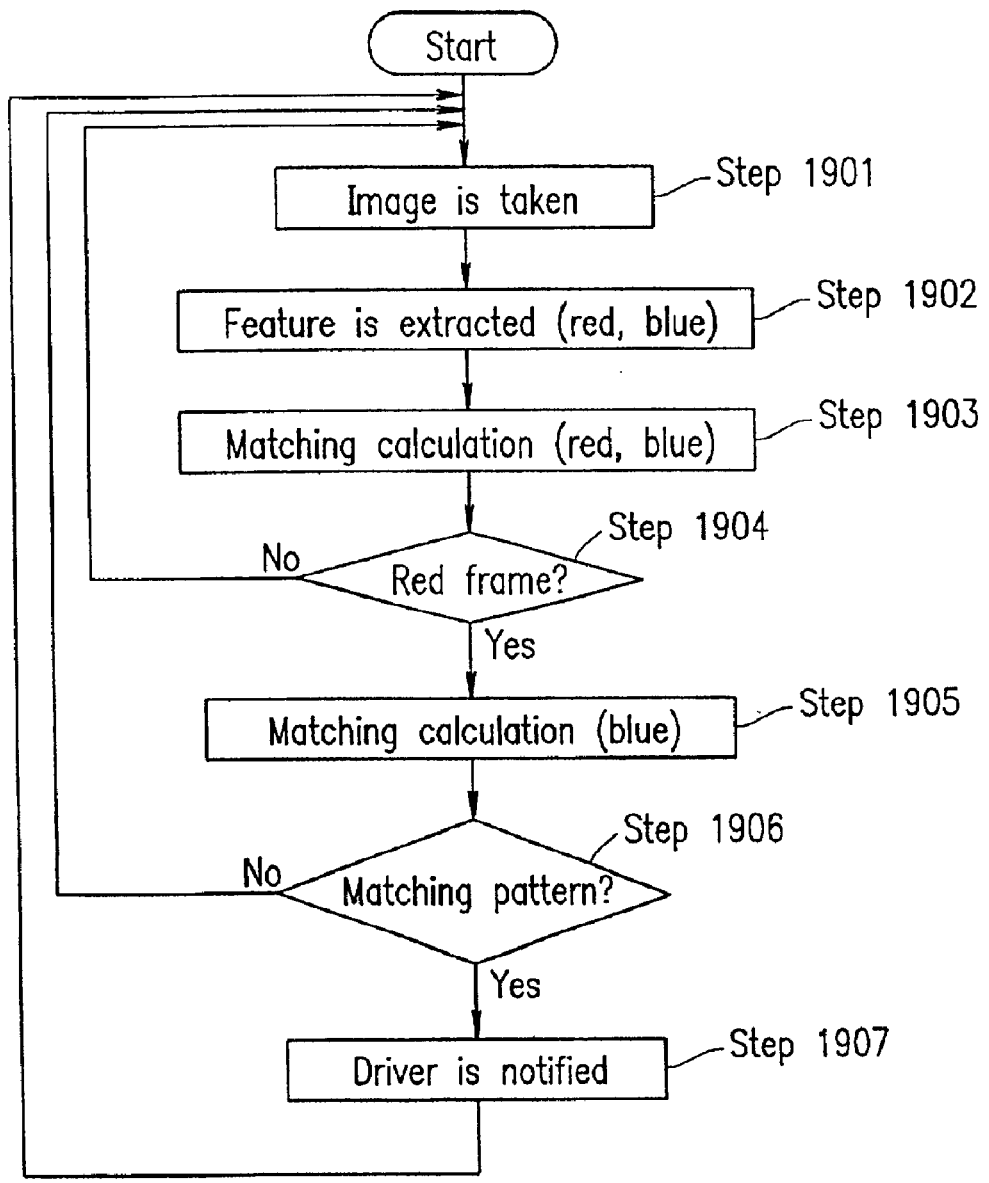
FIG. 19 shows a process for performing image recognition by a conventional image recognition apparatus.

FIG. 17 shows an exemplary structure of an image detection apparatus 1500 according to a fourth example of the present invention.

The image detection apparatus 1500 includes an environment measuring section 1501 and a database 1505 in addition to the representative color area extraction section 201, the candidate area extraction section 202, and the comparison section 203 also included in the image detection apparatus 107 (FIG. 2). Identical elements previously discussed with respect to FIG. 2 bear identical reference numerals and the detailed descriptions thereof will be omitted.

The database 1505 stores at least one target data set in association with at least one environment set. Each of the at least one target data set includes at least one target data unit. The target data unit is similar to each of the target data units 401a, 401b, 401c, . . . described above with reference to FIG. 4. An environment set is a combination of information on district, season, time, direction, weather, and the like. The district is classified in advance in accordance with GPS (Global Positioning System) data (longitude, latitude) as, for example, Kyoto, big city (Tokyo, Osaka, Nagoya, etc.), mountainous district, suburb, seaside, and snowy district. The time is classified in advance by the clock as morning, afternoon, evening and night. The season is classified in advance by the calendar as spring, summer, fall and winter. The direction is classified in advance according to the compass as east, west, south and north. The weather is classified in advance by the value of the amount of sunlight, such as cloudy, fine or night time.

FIG. 18A schematically shows the target data sets stored in the database 1505 in association with the environment sets. In the database 1505, the environment set of line 1801 includes Kyoto as the district, spring as the season, morning as the time, north as the direction, and fine weather as the weather. The target data set associated with the environment set of line 1801 is a target data set 1805 (target data unit A1 on signboard A, target data unit B1 on signboard B, . . . ). The target data set 1805 corresponds to, for example, the target data unit shown in FIG. 4. The target data unit A1, the target data unit B1, . . . respectively correspond to the target data unit 401a, the target data unit 401b, . . . . The environment set of line 1802 is the same as the environment set of line 1801 except that Osaka is the district. The target data set associated with the environment set of line 1802 also includes target data unit A3, target data unit B3, . . . as in the case of line 1801. The reason for this is because the colors used for the signboard are sometimes subtly different in accordance with the district. In Kyoto, Japan, for example, subtly different colors are used for the signboard from those in other districts in order to avoid spoiling the specific scenery provided by a great number of temples and other historical buildings.

FIG. 18B schematically shows an example of signboards in Kyoto and Osaka. A signboard 1803 has target data unit A1 of line 1801. A signboard 1804 has target data unit A3 of line 1802. The signboard 1803 is in Kyoto, and the signboard 1804 is in Osaka. Although the signboard 1803 and the signboard 1804 both represent signboard A but have different target data units since the colors used are subtly different. In FIG. 18B, different colors are represented by different hatching patterns.

The environment measuring section 1501 measures the parameters of the environment in which the image detection apparatus 1500 is located (for example, the district, season, time, direction and weather) and searches through the database 1505 to select one target data set which is associated with the environment set (for example, the district, season, time, direction and weather) obtained by the measurement, among at least one target data set stored in the database 1505 in association with at least one environment set.

The environment measuring section 1501 includes environment measuring tools such as, for example, a clock, a calendar, a GPS, a compass, and a sunlight meter in order to measure the above parameters of the environment. Using these environment measuring tools, the environment measuring section 1501 measures the time, season, district, direction, weather and the like, and compares each measured value with the bordering value of the above classification so as to find the class to which the environment of interest belongs. Based on the classes obtained, the environment measuring section 1501 selects at least one target data unit from the database 1505.

When, for example, the user drives the moving body 101 (FIG. 1) with the image detection apparatus 1500 mounted thereon in the afternoon of a fine day in a snowy district in a northern direction, the environment measuring section 1501 selects a target data set 1806 stored in the database 1505 in association with the environment set of line 1803 in FIG. 18A from the at least one target data set. Next, the representative color area extraction section 201 specifies, from among the at least one target data unit, target data unit A8having information corresponding to the information (for example, the name of signboard A) specifying the target which is input to the representative color area extraction section 201, using the information (for example, the name of signboard A) specifying the target input to the representative color area extraction section 201 as a key. Thereafter, the representative color area extraction section 201, the candidate area extraction section 202, and the comparison section 203 detect the target based on the read target data unit A8 in a manner similar to that described in the first example.

In the fourth example, the database 1505 stores at least one target data unit corresponding to each of at least one environment set. Therefore, the target can be detected in a manner suitable to the environment (e.g., the district, season, time, direction, weather and the like). The environment measuring section 1501 measures the parameters of the environment in which the image detection apparatus 1500 is located, and selects at least one target data set corresponding to the environment from the database 1505. Therefore, the target can be accurately detected without relying on the environment.

In this example, the time, season, district, direction and weather are used as the parameters of the environment. Only a part thereof or other parameters may be used as the parameters of the environment.

The representative color area extraction section 201 may perform the following operation instead of the operation of step 603 (FIG. 5). The representative color area extraction section 201 controls the method for obtaining a representative color image, using the amount of sunlight measured by the environment measuring section 1501. When the amount of sunlight is smaller than a predetermined threshold value (for example, at night), a similarity of each pixel in hue is multiplied by the luminance of a corresponding pixel in the input image (or luminance×chroma), and the resultant value is used as a pixel value of a representative color image. When the amount of sunlight is larger than the predetermined threshold value (for example, in the morning or in the afternoon), a value obtained by multiplying the similarity in hue by the chroma is used as the pixel value of a representative color image as in step 603.

In the example shown in FIG. 17, the representative color area extraction section 201, the candidate area extraction section 202, and the comparison section 203 each search through the database 1505. The structure of the image detection apparatus 1500 is not limited to this. According to an alternative structure, the environment measuring section 1501 measures the parameters of the environment in which the image detection apparatus 1500 is located, and searches for the database 1505 to select one target data set associated with the environment sets obtained by the measurement, from among at least one target data set stored in the database 1505 in association with the environment sets. The environment measuring section 1501 also receives the target to be detected in the input image designated using the input device 103, selects the only target data unit having the information specifying the target, from among the target data set selected from the database 1505. The environment measuring section 1501 provides the only target data unit selected to the representative color area extraction section 201, the candidate area extraction section 202 and the comparison section 203.

EXAMPLE 5

The processing described in the first through fourth examples can be easily implemented by a separate computer, by recording an image detection program for realizing the structure of the image detection apparatus shown in the first through fourth examples on a data recording medium, such as a flexible disc or the like.

Figure 20A:
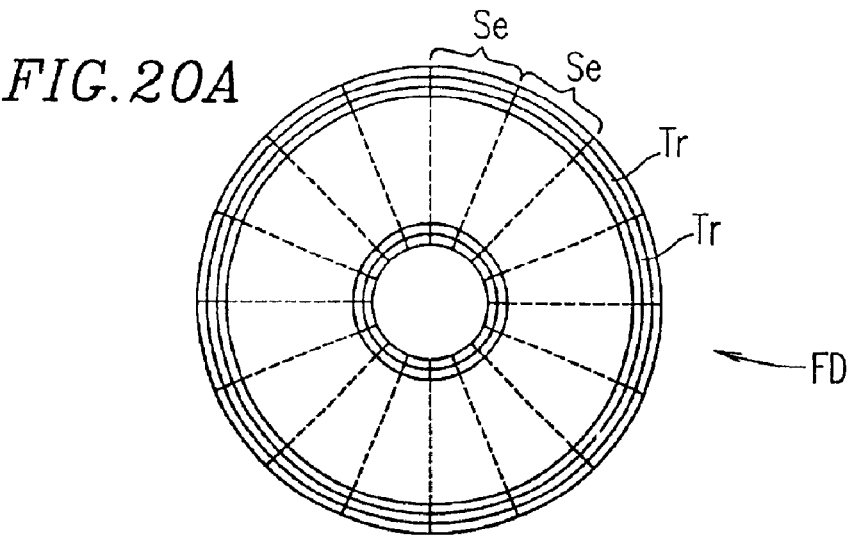
FIG. 20A shows an example of a recording medium.

FIG. 20A shows an example of a recording medium. FIG. 20A shows a physical format of a flexible disc FD as an example of the recording medium. The flexible disc FD has a plurality of tracks Tr provided concentrically in a surface thereof. Each track Tr is divided in a radial direction of the flexible disc FD into 16 sectors Se. The image detection program is stored in the sectors Se.

Figure 20B:
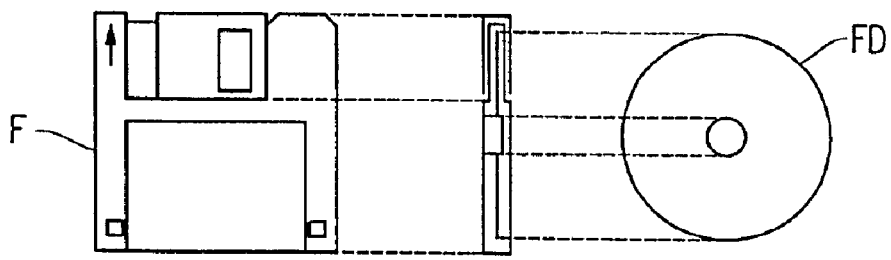
FIG. 20B shows an example of a flexible disc and a flexible disc case.

FIG. 20B shows a flexible disc FD and a flexible disc case F for accommodating the flexible disc FD.

Figure 20C:
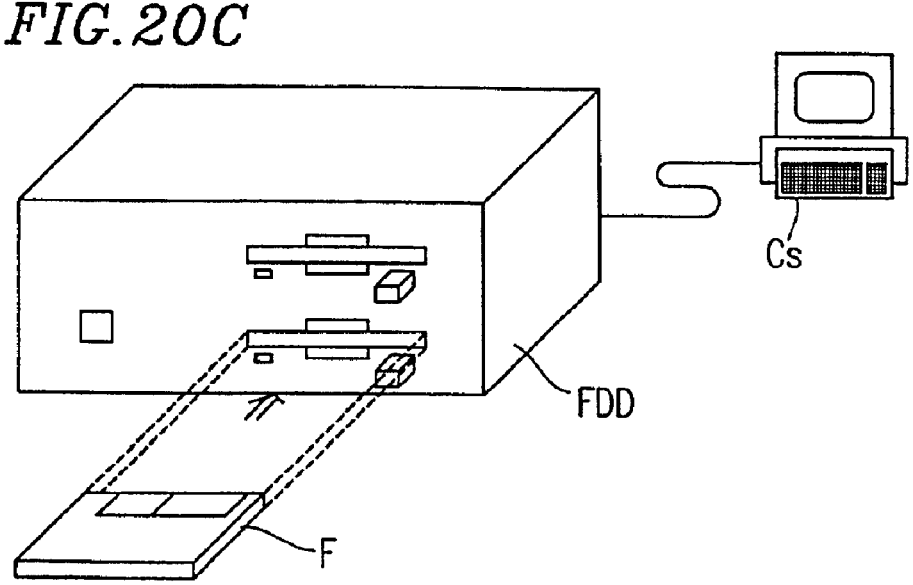
FIG. 20C schematically shows a structure for implementing the present invention using a computer system.

FIG. 20C schematically shows a structure for implementing the present invention using a computer system Cs. The computer system Cs records the image detection program on the flexible disc FD and reproduces the image detection program recorded thereon. In order to record the image detection program on the flexible disc FD, the computer system Cs writes the image detection program on the flexible disc FD via a flexible disc drive FDD. In order to construct an encoding or a decoding device in the computer system Cs via the image detection program recorded on the flexible disc FD, the flexible disc drive FDD reads the image detection program from the flexible disc FD and transfers the image detection program to the computer system Cs.

The recording medium is not limited to a flexible disc, and may be any medium which can record a program thereon such as, for example, an optical disc, an IC card, a ROM cassette, or a solid-state memory.

In the first through fourth examples, a target in the image input by the image input device is detected on-line. Alternatively, a target in an image recorded on a recording medium such as a hard disc or the like may be detected. In this case, in the fourth example, image detection can be performed off-line by adding measurement data obtained by the environment measuring section 1501 when the image is recorded on the recording medium.

In an image detection apparatus according to the present invention, a database storing at least one target data unit is provided. Each of the at least one target data unit includes information specifying the target to be detected, used color data representing a plurality of used colors which are used in the target, representative color data representing a representative color selected from the plurality of used colors, and a cluster image representing a positional arrangement of a plurality of areas respectively having the plurality of used colors. Thus, a target data unit representing a target having any color and any shape can be stored in the database. As a result, a target having any color and any shape can be detected.

According to an image detection apparatus of the present invention, a representative color area extraction section extracts from the input image, as a representative color area, an area having substantially the same color as the representative color represented by the representative color data included in the specified target data unit, regardless of the shape of the representative color area in the input image. A candidate area extraction section obtains a candidate area possibly including the target, using relative positions of an area having the representative color in the cluster image and a frame of the cluster image, regardless of the size of the cluster image. Thus, the processing speed of the image detection apparatus can be improved.

According to an image detection apparatus of the present invention, a comparison section performs comparison in consideration of the positional arrangement of areas having the used colors as well as the shape of the areas having the used colors. Thus, the detection precision of the image detection apparatus can be improved over the case where the comparison is performed in consideration only of the shape of the areas.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image detection apparatus for detecting a target in an input image, comprising:

a database storing at least one target data unit, each of the at least one target data unit including information specifying the target to be detected, used color data representing a plurality of used colors which are used in the target, representative color data representing a representative color selected from the plurality of used colors, and a cluster image representing a positional arrangement of a plurality of areas respectively having the plurality of used colors;

a representative color area extraction section for receiving the input image and information specifying the target to be detected in the input image, specifying a target data unit, from among at least one target data unit stored in the database, which corresponds to the information specifying the target to be detected in the input image, and extracting from the input image, as a representative color area, at least one area having substantially the same color as the representative color represented by the representative color data included in the specified target data unit;

a candidate area extraction section for obtaining at least one candidate area possibly including the target from among the at least one representative color area extracted by the representative color area extraction section, using relative positions of an area having the representative color in the cluster image included in the specified target data unit and a frame of the cluster image; and a comparison section for comparing the cluster image included in the specified target data unit and each of the at least one candidate area obtained by the candidate area extraction section, and detecting one of the at least one candidate area obtained by the candidate area extraction section based on the comparison result as an area including the target.

2. An image detection apparatus according to claim 1, wherein regarding the at least one representative color area, a product of a similarity and a value of one selected from the group consisting of chroma, luminance, and a product of the chroma and the luminance is larger than a predetermined threshold value, the similarity being obtained from a distance between a hue of each pixel included in the input image and the representative color included in the target data unit, and the chroma and the luminance being of each of the pixels included in the input image.

3. An image detection apparatus according to claim 1, wherein the representative color has a highest chroma among the plurality of used colors.

4. An image detection apparatus according to claim 1, wherein the plurality of used colors are each assigned a color number, the cluster image includes a plurality of pixels, and each of the plurality of pixels included in the cluster image has a pixel value represented by the color number.

5. An image detection apparatus according to claim 1, wherein:

the plurality of used colors include an achromatic color and a non-achromatic color, the comparison section detects one of the at least one candidate area as the area possibly including the target based on an inter-image distance between the cluster image and one of the at least one candidate area, when the number of the non-achromatic colors is larger than a first predetermined value, or the number of areas having the non-achromatic color is larger than a second predetermined value, the inter-image distance is determined independent from an inter-pixel distance between each pixel of an area having the achromatic color in the cluster image and a corresponding pixel in the one candidate area, and when the number of the non-achromatic colors is equal to or smaller than the first predetermined value, and the number of areas having the non-achromatic color is equal to or smaller than the second predetermined value, the inter-image distance is determined relying on the inter-pixel distance.

6. An image detection apparatus according to claim 1, wherein:

the plurality of used colors include an achromatic color and a non-achromatic color, the comparison section detects one of the at least one candidate area as the area possibly including the target based on an inter-image distance between the cluster image and one of the at least one candidate area, when the number of the non-achromatic colors is equal to or smaller than the first predetermined value, and the number of areas having the non-achromatic color is equal to or smaller than the second predetermined value, the inter-image distance is determined based on an inter-pixel distance between each pixel of an area having the achromatic color in the cluster image and a corresponding pixel in the one candidate area and also based on an inter-pixel distance between each pixel of an area having the non-achromatic color in the cluster image and a corresponding pixel in the one candidate area, the inter-pixel distance between each pixel of an area having the achromatic color in the cluster image and a corresponding pixel in the one candidate area is obtained based on a luminance normalized by an average luminance of the area having the representative color in the cluster image and a luminance normalized by an average luminance of the representative color area in the one candidate area, and the inter-pixel distance between each pixel of an area having the non-achromatic color in the cluster image and a corresponding pixel in the one candidate area is obtained based on a hue of each pixel in the cluster image and a hue of each pixel in the one candidate area.

7. An image detection apparatus according to claim 1, wherein:

the candidate area extraction section performs at least one of expansion and reduction of each of the at least one representative color area by a predetermined amount, and obtains a plurality of candidate areas possibly including the target from the at least one representative color area before the expansion or reduction and also obtains a plurality of candidate areas possibly including the target from the at least one representative color area after the expansion or reduction, using relative positions of the area having the representative color area in the cluster image and the frame of the cluster image, and the comparison section compares each of the plurality of candidate areas obtained in each of the at least one candidate area with the cluster image, and detects, as an area including the target, a candidate area which corresponds to an inter-image distance, between each of the plurality of candidate areas and the cluster image, which is shortest and is smaller than a predetermined threshold value.

8. An image detection apparatus according to claim 1, further comprising:

a detection area memory section for storing at least two detection areas detected by the comparison section in association with time; and a processing area specifying section for specifying a processing area in the input image, wherein the processing area specifying section determines whether or not a positional relationship between the at least two detection areas among the at least two detection areas stored in the detection area memory section fulfills a predetermined condition; when the positional relationship fulfills the predetermined condition, the processing area specifying section specifies the detection section, among the at least two detection sections, which is associated with a latest time and a vicinity thereof as a processing area in the input image; and when the positional relationship does not fulfill the predetermined condition, the processing area specifying section specifies the entire input image as a processing area in the input image.

9. An image detection apparatus according to claim 1, wherein:

the database stores at least one target data set in association with each of at least one environment, and each of the at least one target data set includes at least one target data unit, the image detection apparatus further comprises an environment measuring section for measuring parameters of an environment in which the image detection apparatus is located and selecting, from the at least one target data set, a target data set stored in association with the environment in which the image detection apparatus is located, from among the at least one environment, based on the measurement result, and the representative color extraction section receives the information specifying the target to be detected in the input image, and specifies a target data unit having information corresponding to the information specifying the target to be detected in the input image, from the selected target data set.

10. An image detection apparatus according to claim 9, wherein regarding the at least one representative color area, a product of a similarity and one selected, based on the parameters of the environment measured by the environment measuring section, from the group consisting of chroma, luminance, and a product of the chroma and the luminance is larger than a predetermined threshold value, the similarity being obtained from a distance between a hue of each of pixels included in the input image and the representative color included in the target data unit, and the chroma and the luminance being of each of the pixels included in the input image.

11. A program for allowing a computer to act as an image detection apparatus for detecting a target in an input image, wherein the image detection apparatus includes:

a database storing at least one target data unit, each of the at least one target data unit including information specifying the target to be detected, used color data representing a plurality of used colors which are used in the target, representative color data representing a representative color selected from the plurality of used colors, and a cluster image representing a positional arrangement of a plurality of areas respectively having the plurality of used colors;

a representative color area extraction section for receiving the input image and information specifying the target to be detected in the input image, specifying a target data unit, from among at least one target data unit stored in the database, which corresponds to the information specifying the target to be detected in the input image, and extracting from the input image, as a representative color area, at least one area having substantially the same color as the representative color represented by the representative color data included in the specified target data unit;

a candidate area extraction section for obtaining at least one candidate area possibly including the target from among the at least one representative color area extracted by the representative color area extraction section, using relative positions of an area having the representative color in the cluster image included in the specified target data unit and a frame of the cluster image; and a comparison section for comparing the cluster image included in the specified target data unit and each of the at least one candidate area obtained by the candidate area extraction section, and detecting one of the at least one candidate area obtained by the candidate area extraction section based on the comparison result.

12. A computer-readable recording medium storing a program for allowing a computer to act as an image detection apparatus for detecting a target in an input image, wherein the image detection apparatus includes:

a database storing at least one target data unit, each of the at least one target data unit including information specifying the target to be detected, used color data representing a plurality of used colors which are used in the target, representative color data representing a representative color selected from the plurality of used colors, and a cluster image representing a positional arrangement of a plurality of areas respectively having the plurality of used colors;

a representative color area extraction section for receiving the input image and information specifying the target to be detected in the input image, specifying a target data unit, from among at least one target data unit stored in the database, which corresponds to the information specifying the target to be detected in the input image, and extracting from the input image, as a representative color area, at least one area having substantially the same color as the representative color represented by the representative color data included in the specified target data unit;

a candidate area extraction section for obtaining at least one candidate area possibly including the target from among the at least one representative color area extracted by the representative color area extraction section, using relative positions of an area having the representative color in the cluster image included in the specified target data unit and a frame of the cluster image; and a comparison section for comparing the cluster image included in the specified target data unit and each of the at least one candidate area obtained by the candidate area extraction section, and detecting one of the at least one candidate area obtained by the candidate area extraction section based on the comparison result.

* * * * *